US012243359B1

(12) United States Patent
Wang

(10) Patent No.: US 12,243,359 B1
(45) Date of Patent: Mar. 4, 2025

(54) METHODS AND APPARATUS FOR IMPROVING VEHICLE COMMUNICATION NETWORK BANDWIDTH

(71) Applicant: Nuro, Inc., Mountain View, CA (US)

(72) Inventor: Yin Wang, Santa Clara, CA (US)

(73) Assignee: NURO, INC., Mountain View, CA (US)

( * ) Notice: Subject to any disclaimer, the term of this patent is extended or adjusted under 35 U.S.C. 154(b) by 358 days.

(21) Appl. No.: 17/709,240

(22) Filed: Mar. 30, 2022

Related U.S. Application Data

(60) Provisional application No. 63/170,945, filed on Apr. 5, 2021.

(51) Int. Cl.
G07C 5/00 (2006.01)
G07C 5/08 (2006.01)
H04L 12/40 (2006.01)

(52) U.S. Cl.
CPC ........... *G07C 5/008* (2013.01); *G07C 5/0816* (2013.01); *H04L 12/40* (2013.01); *H04L 2012/40215* (2013.01); *H04L 2012/40273* (2013.01)

(58) Field of Classification Search
CPC ....... G07C 5/008; G07C 5/0816; H04L 12/40; H04L 2012/40215; H04L 2012/40273
See application file for complete search history.

(56) References Cited

U.S. PATENT DOCUMENTS

| 5,748,629 | A | * | 5/1998 | Caldara | H04L 12/5601 370/413 |
| 7,826,438 | B1 | * | 11/2010 | Salhotra | H04L 1/1887 370/465 |
| 2002/0039351 | A1 | * | 4/2002 | Wang | H04L 47/20 370/417 |
| 2008/0062881 | A1 | * | 3/2008 | Martin | H04W 4/12 455/448 |
| 2008/0294598 | A1 | * | 11/2008 | Imai | G06F 16/1767 |

(Continued)

FOREIGN PATENT DOCUMENTS

| JP | 2010273371 A | * | 12/2010 | |
| WO | WO-2005064983 A1 | * | 7/2005 | ............. H04L 47/10 |

(Continued)

*Primary Examiner* — Babar Sarwar
(74) *Attorney, Agent, or Firm* — Edell, Shapiro & Finnan, LLC

(57) ABSTRACT

According to one aspect, bandwidth associated with a vehicle communication network, such as a controller area network (CAN), is allocated by assigning priorities to systems in an autonomous vehicle which use the vehicle communication network to communicate with a vehicle control unit (VCU). Systems with high priority levels may exchange data or information with a VCU at substantially all times, while systems with lower priority levels may exchange data or information with the VCU substantially only when that data or information is requested or otherwise needed. A significant percentage of the bandwidth of the network may be allocated for the exchange of data between high priority systems and a VCU, while the remaining percentage of the bandwidth may be allocated for the exchange of data between lower priority systems and the VCU when needed. As a result, the bandwidth associated with the network may be used efficiently.

20 Claims, 22 Drawing Sheets

(56) References Cited

U.S. PATENT DOCUMENTS

| | | | | |
|---|---|---|---|---|
| 2009/0295559 | A1* | 12/2009 | Howell | B60W 50/0205 340/459 |
| 2009/0319686 | A1* | 12/2009 | Watanabe | H04L 45/00 709/240 |
| 2010/0220679 | A1* | 9/2010 | Abraham | H04W 74/06 370/329 |
| 2017/0371698 | A1* | 12/2017 | Paolino | H04L 49/70 |
| 2018/0091597 | A1* | 3/2018 | Kim | G07C 5/0808 |
| 2018/0232959 | A1* | 8/2018 | Thornburg | H04L 43/0805 |
| 2019/0079842 | A1* | 3/2019 | Chae | G06F 11/3006 |
| 2019/0190843 | A1* | 6/2019 | Bastable | H04L 47/24 |
| 2019/0250610 | A1* | 8/2019 | Luo | B60W 50/0098 |
| 2019/0253902 | A1* | 8/2019 | Dhanapal | H04W 48/18 |
| 2019/0302753 | A1* | 10/2019 | Fujii | G08G 1/205 |
| 2019/0379683 | A1* | 12/2019 | Overby | H04W 4/48 |
| 2020/0126325 | A1* | 4/2020 | Jeon | G07C 5/0866 |
| 2020/0178198 | A1* | 6/2020 | Ding | H04W 60/04 |
| 2021/0065474 | A1* | 3/2021 | Liu | G07C 5/0808 |
| 2021/0120088 | A1* | 4/2021 | Barton | H04L 41/0886 |
| 2021/0192867 | A1* | 6/2021 | Fang | G07C 5/008 |
| 2021/0370961 | A1* | 12/2021 | Mitsugi | H04L 12/40 |
| 2022/0028185 | A1* | 1/2022 | Wang | B60W 40/09 |
| 2022/0308791 | A1* | 9/2022 | Jayaram Masti | G06F 3/0611 |
| 2022/0393903 | A1* | 12/2022 | Kamiguchi | H04L 12/46 |
| 2023/0362872 | A1* | 11/2023 | Hu | H04L 5/0048 |
| 2024/0163172 | A1* | 5/2024 | Fang | H04L 63/0236 |

FOREIGN PATENT DOCUMENTS

| | | | | |
|---|---|---|---|---|
| WO | WO-2019231453 | A1 * | 12/2019 | H04L 47/00 |
| WO | 2020136707 | A1 | 7/2020 | |

* cited by examiner

METHODS AND APPARATUS FOR IMPROVING VEHICLE COMMUNICATION NETWORK BANDWIDTH

CROSS-REFERENCE TO RELATED APPLICATIONS

This application claims the benefit of Provisional U.S. Application Ser. No. 63/170,945, filed Apr. 5, 2021, titled "METHODS AND APPARATUS FOR IMPROVING CONTROLLER AREA NETWORK (CAN) BANDWIDTH"; the aforementioned priority application being hereby incorporated by reference in its entirety.

TECHNICAL FIELD

The disclosure relates to providing systems for use in autonomous vehicles. More particularly, the disclose relates to efficiently utilizing bandwidth with respect to a vehicle communication network, such as a controller area network (CAN) bus.

BACKGROUND

Systems, as for example devices, included in an autonomous vehicle often communicate with each other in order to enable the systems to cooperate to enable the autonomous vehicle to operate. Such communications are typically supported by a vehicle communication network such as a controller area network (CAN) bus. In many situations, the amount of bandwidth available on a vehicle communication network may be insufficient. That is, the communications load on a vehicle communication network may often be significant. In general, the amount of data exchanged or otherwise carried on a vehicle communication network may be a significant burden to communications channels in general, and may essentially limit bandwidth. Limiting bandwidth may result in the inefficient operation of an autonomous vehicle.

BRIEF DESCRIPTION OF THE DRAWINGS

The disclosure will be readily understood by the following detailed description in conjunction with the accompanying drawings in which.

DESCRIPTION OF EXAMPLE EMBODIMENTS

General Overview

Figure 1:
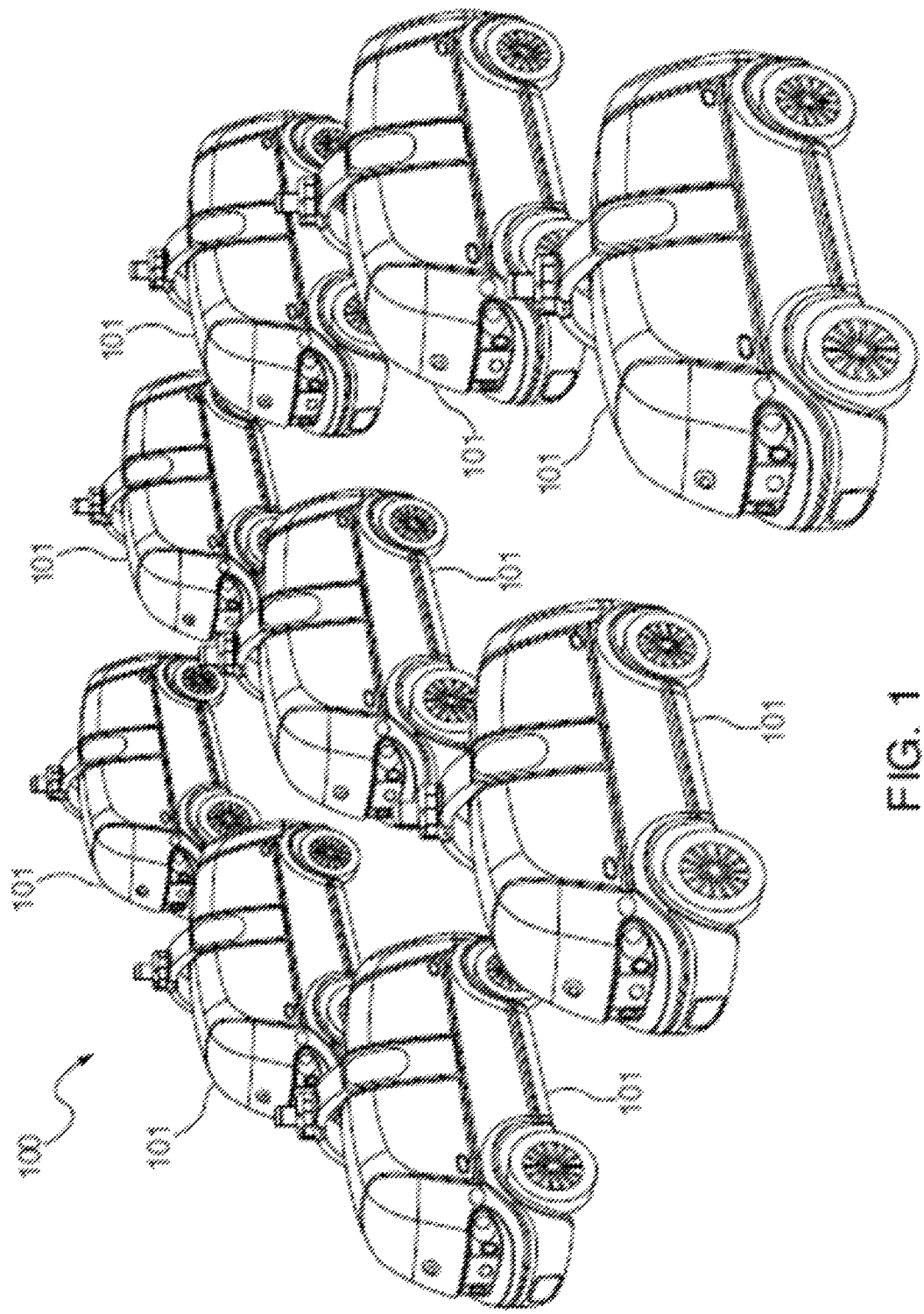
FIG. 1 is a diagrammatic representation of an autonomous vehicle fleet in accordance with an embodiment.

In one embodiment, bandwidth associated with a vehicle communication network such as a controller area network (CAN) is allocated by assigning priorities to systems in an autonomous vehicle which use the vehicle communication network to communicate with a vehicle control unit (VCU). Systems that include signals with high priority levels may exchange high priority data or information with a VCU at substantially all times, while systems that include lower priority levels may exchange lower priory data or information with the VCU substantially only when that data or information is requested or otherwise needed. A significant percentage of the bandwidth of a vehicle communication network may be allocated for the exchange of higher priority data with a VCU, while the remaining percentage of the bandwidth may be allocated for the exchange of lower priority data with the VCU when needed. As a result, the bandwidth associated with a vehicle communication network may be used efficiently.

In one embodiment, a vehicle control unit for a vehicle comprises one or more processors, one or more interfaces for communicating over a vehicle communication network, and one or more memory resources that stores instructions that are executable by the one or more processors. The vehicle control unit may be configured to periodically receive high priority messages over the vehicle communication network from a plurality of electronic control units. The vehicle control unit may be further configured to determine, based on a first high priority message received from a first electronic control unit of the plurality of vehicle control units, to request a set of lower priority data from the first electronic control unit. The vehicle control unit may be further configured to, in response to the determinization, transmit, over the vehicle communication network to the first electronic control unit, a request to cause the first electronic control unit to transmit the set of lower priority data to the vehicle control. Still further, the vehicle control unit may be configured to receive the set of lower priority data over the vehicle communication network from the first electronic control unit.

Description

The ability to efficiently utilize resources, as for example communications bandwidth, within an autonomous vehicle is critical to the operation of the autonomous vehicle. If communications bandwidth on a vehicle communication network such as a CAN bus which allows systems within an autonomous vehicle to communicate with each other is not allocated efficiently, bandwidth may be limited for important data. When there is insufficient bandwidth to enable high priority data to be exchanged on a vehicle communication network of an autonomous vehicle, the safe operation of the autonomous vehicle may be adversely affected.

By allocating bandwidth associated with a vehicle communication network by prioritizing data that is to be exchanged using the vehicle communication network, higher priority data may be allocated sufficient bandwidth to substantially always be transmitted and received using the vehicle communication network. Systems with data that is assigned relatively high priority levels may exchange data or information with a vehicle control unit (VCU) at substantially all times, while systems with data that is assigned lower or relatively low priority levels may exchange data or information with the VCU substantially on an as needed basis. As such, the availability of sufficient bandwidth to support the exchange of higher priority data may effectively be ensured. In some instances, a system may have data with different priority levels such that the data with a higher priority level may be arranged to substantially always be transmitted, while the data with the lower priority level may be arranged to be transmitted on an as needed basis.

Autonomous vehicles may generally be part of a fleet of autonomous vehicles. Referring initially to FIG. 1, an autonomous vehicle fleet will be described in accordance with an embodiment. An autonomous vehicle fleet 100 includes a plurality of autonomous vehicles 101, or robot vehicles. Autonomous vehicles 101 are generally arranged to transport and/or to deliver cargo, items, and/or goods. Autonomous vehicles 101 may be fully autonomous and/or semi-autonomous vehicles. In general, each autonomous vehicle 101 may be a vehicle that is capable of travelling in a controlled manner for a period of time without intervention, e.g., without human intervention. As will be discussed in more detail below, each autonomous vehicle 101 may include a power system, a propulsion or conveyance system, a navigation module, a control system or controller, a communications system, a processor, and a sensor system.

Dispatching of autonomous vehicles 101 in autonomous vehicle fleet 100 may be coordinated by a fleet management module (not shown). The fleet management module may dispatch autonomous vehicles 101 for purposes of transporting, delivering, and/or retrieving goods or services in an unstructured open environment or a closed environment.

Figure 2:
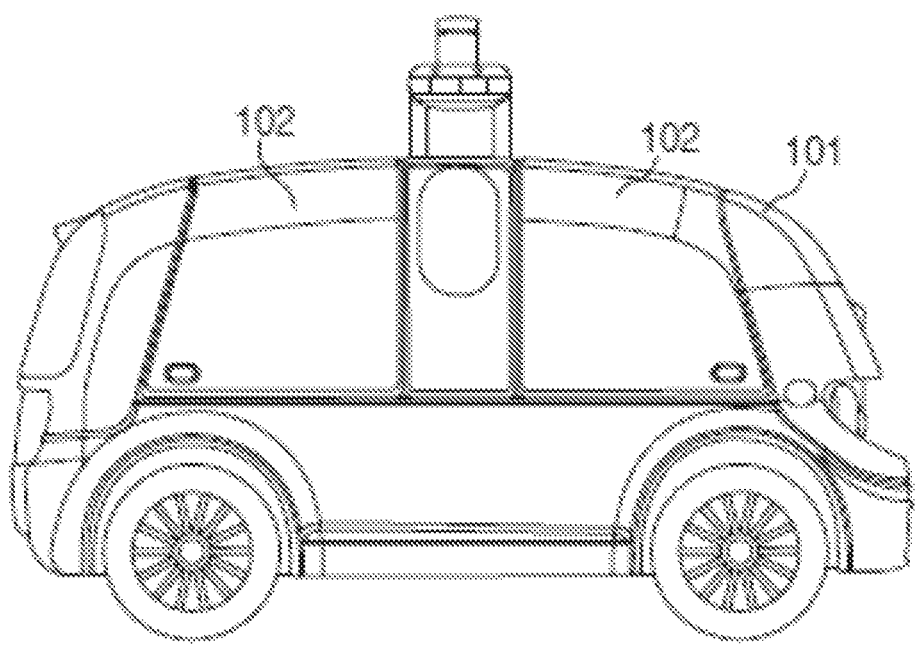
FIG. 2 is a diagrammatic representation of a side of an autonomous vehicle in accordance with an embodiment

FIG. 2 is a diagrammatic representation of a side of an autonomous vehicle, e.g., one of autonomous vehicles 101 of FIG. 1, in accordance with an embodiment. Autonomous vehicle 101, as shown, is a vehicle configured for land travel. Typically, autonomous vehicle 101 includes physical vehicle components such as a body or a chassis, as well as conveyance mechanisms, e.g., wheels. In one embodiment, autonomous vehicle 101 may be relatively narrow, e.g., approximately two to approximately five feet wide, and may have a relatively low mass and relatively low center of gravity for stability. Autonomous vehicle 101 may be arranged to have a working speed or velocity range of between approximately one and approximately forty-five miles per hour (mph), e.g., approximately twenty-five miles per hour. In some embodiments, autonomous vehicle 101 may have a substantially maximum speed or velocity in range between approximately thirty and approximately ninety mph.

Autonomous vehicle 101 includes a plurality of compartments 102. Compartments 102 may be assigned to one or more entities, such as one or more customer, retailers, and/or vendors. Compartments 102 are generally arranged to contain cargo, items, and/or goods. Typically, compartments 102 may be secure compartments. It should be appreciated that the number of compartments 102 may vary. That is, although two compartments 102 are shown, autonomous vehicle 101 is not limited to including two compartments 102.

Figure 3:
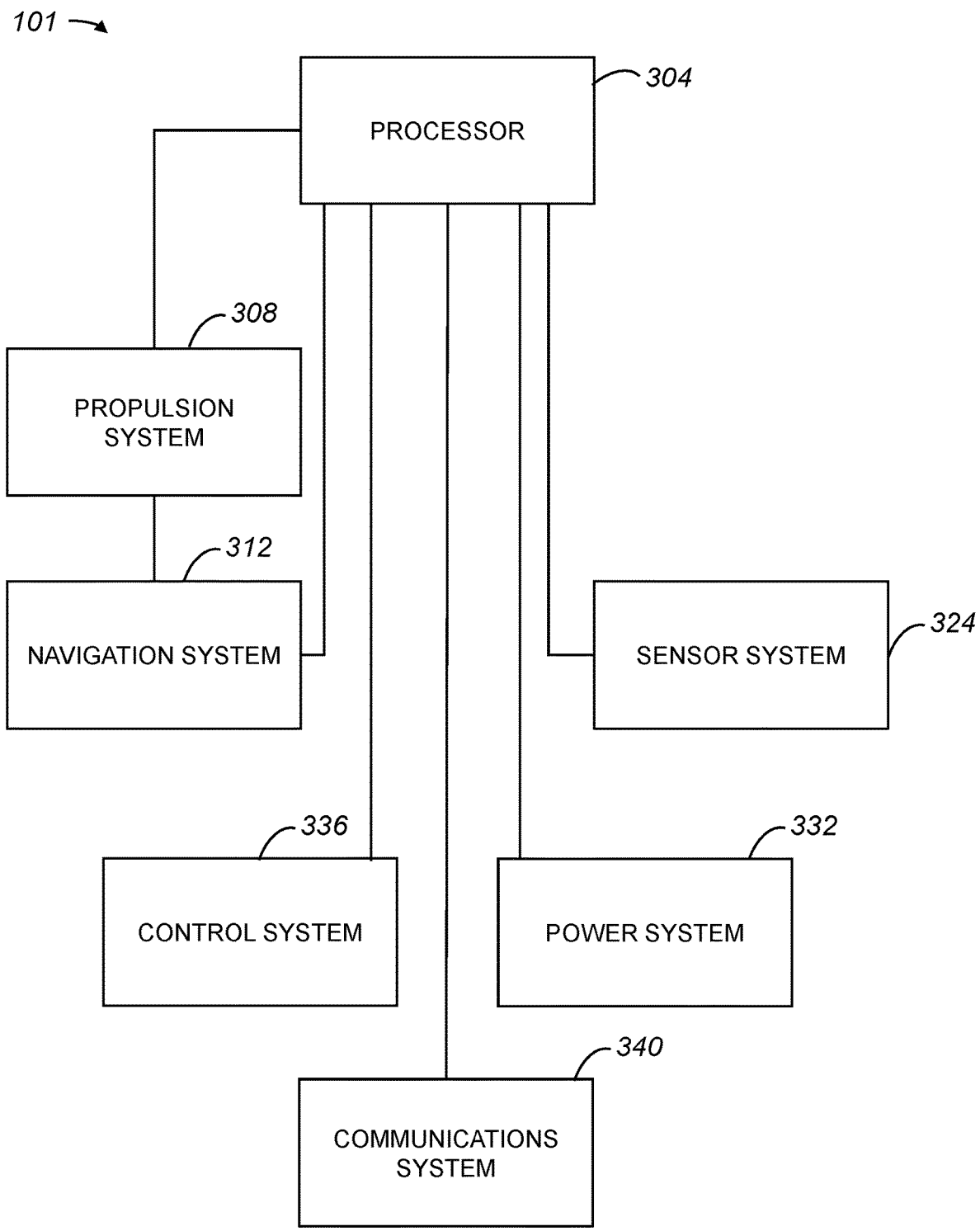
FIG. 3 is a block diagram representation of an autonomous vehicle in accordance with an embodiment.

FIG. 3 is a block diagram representation of an autonomous vehicle, e.g., autonomous vehicle 101 of FIG. 1, in accordance with an embodiment. An autonomous vehicle 101 includes a processor 304, a propulsion system 308, a navigation system 312, a sensor system 324, a power system 332, a control system 336, and a communications system 340. It should be appreciated that processor 304, propulsion system 308, navigation system 312, sensor system 324, power system 332, and communications system 340 are all coupled to a chassis or body of autonomous vehicle 101.

Processor 304 is arranged to send instructions to and to receive instructions from or for various components such as propulsion system 308, navigation system 312, sensor system 324, power system 332, and control system 336. Propulsion system 308, or a conveyance system, is arranged to cause autonomous vehicle 101 to move, e.g., drive. For example, when autonomous vehicle 101 is configured with a multi-wheeled automotive configuration as well as steering, braking systems and an engine, propulsion system 308 may be arranged to cause the engine, wheels, steering, and braking systems to cooperate to drive. In general, propulsion system 308 may be configured as a drive system with a propulsion engine, wheels, treads, wings, rotors, blowers, rockets, propellers, brakes, etc. The propulsion engine may be a gas engine, a turbine engine, an electric motor, and/or a hybrid gas and electric engine.

Navigation system 312 may control propulsion system 308 to navigate autonomous vehicle 101 through paths and/or within unstructured open or closed environments. Navigation system 312 may include at least one of digital maps, street view photographs, and a global positioning system (GPS) point. Maps, for example, may be utilized in cooperation with sensors included in sensor system 324 to allow navigation system 312 to cause autonomous vehicle 101 to navigate through an environment.

Sensor system 324 includes any sensors, as for example LiDAR, radar, ultrasonic sensors, microphones, altimeters, and/or cameras. Sensor system 324 generally includes onboard sensors which allow autonomous vehicle 101 to safely navigate, and to ascertain when there are objects near autonomous vehicle 101. In one embodiment, sensor system 324 may include propulsion systems sensors that monitor drive mechanism performance, drive train performance, and/or power system levels.

Power system 332 is arranged to provide power to autonomous vehicle 101. Power may be provided as electrical power, gas power, or any other suitable power, e.g., solar power or battery power. In one embodiment, power system 332 may include a main power source, and an auxiliary power source that may serve to power various components of autonomous vehicle 101 and/or to generally provide power to autonomous vehicle 101 when the main power source does not have the capacity to provide sufficient power.

Communications system 340 allows autonomous vehicle 101 to communicate, as for example, wirelessly, with a fleet management system (not shown) that allows autonomous vehicle 101 to be controlled remotely. Communications system 340 generally obtains or receives data, stores the data, and transmits or provides the data to a fleet management system and/or to autonomous vehicles 101 within a fleet 100. The data may include, but is not limited to including, information relating to scheduled requests or orders, information relating to on-demand requests or orders, and/or information relating to a need for autonomous vehicle 101 to reposition itself, e.g., in response to an anticipated demand.

In some embodiments, control system 336 may cooperate with processor 304 to determine where autonomous vehicle 101 may safely travel, and to determine the presence of objects in a vicinity around autonomous vehicle 101 based on data, e.g., results, from sensor system 324. In other words, control system 336 may cooperate with processor 304 to effectively determine what autonomous vehicle 101 may do within its immediate surroundings. Control system 336 in cooperation with processor 304 may essentially control power system 332 and navigation system 312 as part of driving or conveying autonomous vehicle 101. Additionally, control system 336 may cooperate with processor 304 and communications system 340 to provide data to or obtain data from other autonomous vehicles 101, a management server, a global positioning server (GPS), a personal computer, a teleoperations system, a smartphone, or any computing device via the communication module 340. In general, control system 336 may cooperate at least with processor 304, propulsion system 308, navigation system 312, sensor system 324, and power system 332 to allow vehicle 101 to operate autonomously. That is, autonomous vehicle 101 is able to operate autonomously through the use of an autonomy system that effectively includes, at least in part, functionality provided by propulsion system 308, navigation system 312, sensor system 324, power system 332, and control system 336. Components of propulsion system 308, navigation system 312, sensor system 324, power system 332, and control system 336 may effectively form a perception system that may create a model of the environment around autonomous vehicle 101 to facilitate autonomous or semi-autonomous driving.

Control system 336, as shown, includes a higher-level control unit 338, a first sub-system 342a, a second sub-system 342b, an optional buffer 344, and a processor 346. Higher-level control unit 338 may be a VCU, or a control unit which may effectively be a domain controller for autonomous vehicle 101. Sub-systems 342a, 342b may generally be electronic control units (ECUs), or modules which may control electrical systems or devices included in autonomous vehicle 101. In one embodiment, sub-systems 342a, 342b may include, but are not limited to including, ECUs such as traction motor controllers (TMCs). Optional buffer 344 may buffer lower priority data that associated with sub-systems 342, 342b that is not provided to higher-level control unit 338 unless requested or otherwise determined to be substantially necessary. By buffering such data, the data may be available to be subsequently provided to higher-level control unit 338 if requested. Processor 346 may generally be configured to determine which signals are to be exchanged between higher-level control unit 338 and sub-systems 342a, 342b, as for example using a CAN bus.

As will be appreciated by those skilled in the art, when autonomous vehicle 101 operates autonomously, vehicle 101 may generally operate, e.g., drive, under the control of an autonomy system. That is, when autonomous vehicle 101 is in an autonomous mode, autonomous vehicle 101 is able to generally operate without a driver or a remote operator controlling autonomous vehicle. In one embodiment, autonomous vehicle 101 may operate in a semi-autonomous mode or a fully autonomous mode. When autonomous vehicle 101 operates in a semi-autonomous mode, autonomous vehicle 101 may operate autonomously at times and may operate under the control of a driver or a remote operator at other times. When autonomous vehicle 101 operates in a fully autonomous mode, autonomous vehicle 101 typically operates substantially only under the control of an autonomy system. The ability of an autonomous system to collect information and extract relevant knowledge from the environment provides autonomous vehicle 101 with perception capabilities. For example, data or information obtained from sensor system 324 may be processed such that the environment around autonomous vehicle 101 may effectively be perceived.

Figure 4:
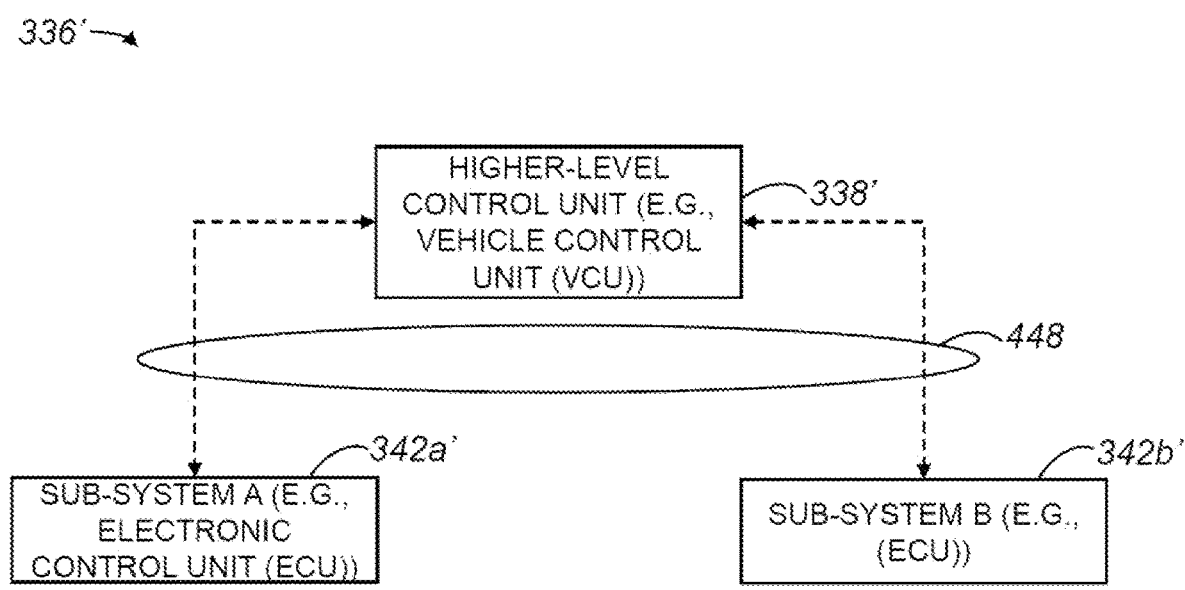
FIG. 4 is a block diagram representation of a control system of an autonomous vehicle, e.g., control system 336 of FIG. 3, in accordance with an embodiment.

With reference to FIG. 4, control system 336 will be described in accordance with an embodiment. Control system 336' generally supports the exchange of data or information between higher-level control unit 338' and sub-system A 342a', as well as the exchange of data or information between higher-level control unit 338' and sub-system B 342b'. The exchange of data may utilize a CAN that includes a CAN bus 448. The data exchanged generally facilitates the operation of an autonomous vehicle, e.g., autonomous vehicle 101 of FIG. 3, that includes control system 336'.

Figure 5A:
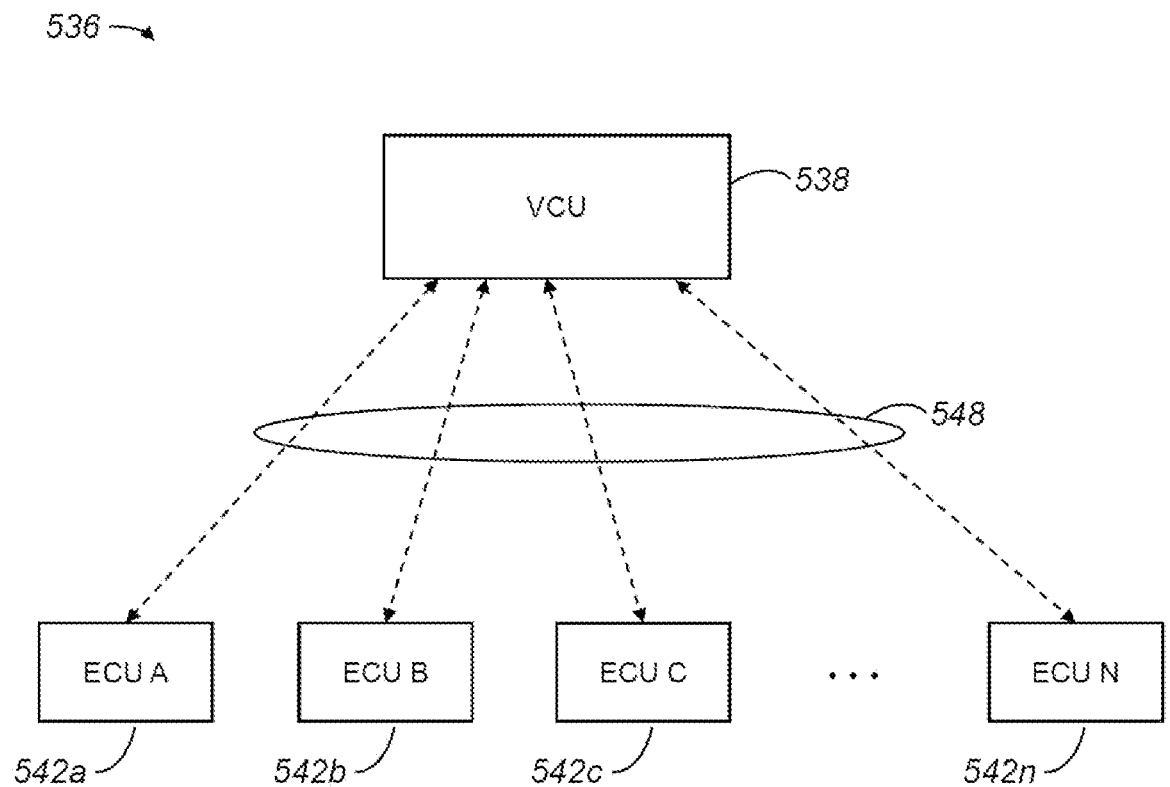
FIG. 5A is a block diagram representation of a control system which includes a vehicle control unit (VCU) communicating with at least one electronic control unit (ECU) in accordance with an embodiment.

As mentioned above, higher-level control unit 338' may be a VCU, and sub-systems 342a', 342b' may be ECUs. Referring next to FIG. 5A, a control system which includes a VCU that exchanges data with ECUs using a CAN or a CAN bus will be described in accordance with an embodiment. A control system 536 includes a VCU 538 and ECUs 542*a-n*. In general, VCU 538 exchanges data with ECUs 542*a-n* via a CAN that includes a CAN bus 548. The number of ECUs 542*a-n* included in control system 536 may vary widely, and may depend upon factors including, but not limited to including, a number of systems or devices included in an autonomous vehicle.

CAN bus 548 generally has an associated amount of communications bandwidth that may effectively be shared by ECUs 542*a-n*. That is, ECUs 542*a-n* are generally configured to share communications bandwidth to exchange data with VCU 538 using CAN bus 548.

In one embodiment, bandwidth associated with CAN bus 548 may be allocated such that ECUs 542*a-n* which are sending or otherwise providing data classified as relatively high priority are provided with sufficient bandwidth to send the data to VCU 538, while ECUs 542*a-n* which are sending data classified as relatively low priority, e.g., low priority or medium priority, are effectively not provided with any dedicated bandwidth unless it is determined that the relatively low priority data is requested or needed. That is, relatively high priority data or data from ECUs 542*a-n* that is classified as having a relatively high level may substantially always utilized bandwidth on CAN bus 548, while lower priority data may be provided with bandwidth on CAN bus 548 substantially only when the lower priority data is requested or needed by VCU 538.

Communications bandwidth associated with CAN bus 548 may be allocated such that a majority of the bandwidth is allocated to be used, as well as shared, to exchange relatively high priority data. The remainder of the bandwidth may be allocated to be used to exchange lower priority data when such lower priority data is requested or needed by VCU 538.

Figure 5B:
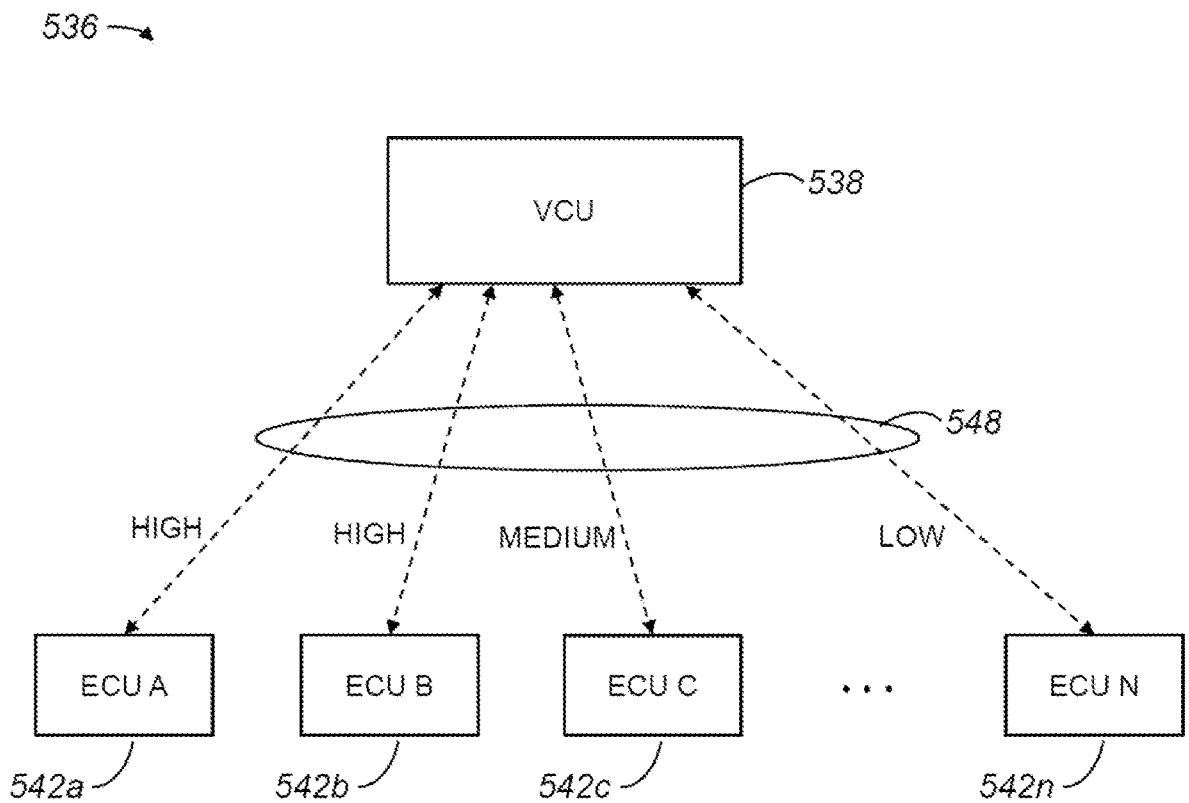
FIG. 5B is a block diagram representation of a control system, e.g., control system 536 of FIG. 3, with a controller area network (CAN) bus in accordance with an embodiment.

As shown in FIG. 5B, ECUs 542*a-n* may be arranged to exchange data classified as having different priority levels. In other words, signals provided to CAN bus 548 by ECUs 542*a-n* may be classified into different groups. In one embodiment, ECU A 542*a* and ECU B 542*a* may be associated with data or information classified as having a "high" priority level, while ECU C 542*c* may be associated with data or information classified as having a "medium priority." ECU N 542*n* may be associated with data or information classified as having a "low" priority level. While levels assigned to data may generally be based on any suitable criteria, in one embodiment, levels may be assigned based upon whether data is critical for use by VCU 538 to facilitate the safe, efficient operation of an autonomous vehicle. By way of example, data that is used by autonomy systems may be classified as "high priority," while data relating to the temperatures of various components may be classified as "low priority."

Each ECU 542*a-n* may be associated with data having a substantially single classification. For example, all data collected and provided by ECU A 542*a* may be classified as "high priority." It should be appreciated, however, that a single ECU 542*a-n* may be associated with data having different classifications. That is, an ECU 542*a-n* may be associated with data classified as "high priority," "medium priority," and/or "low priority."

Figure 6A:
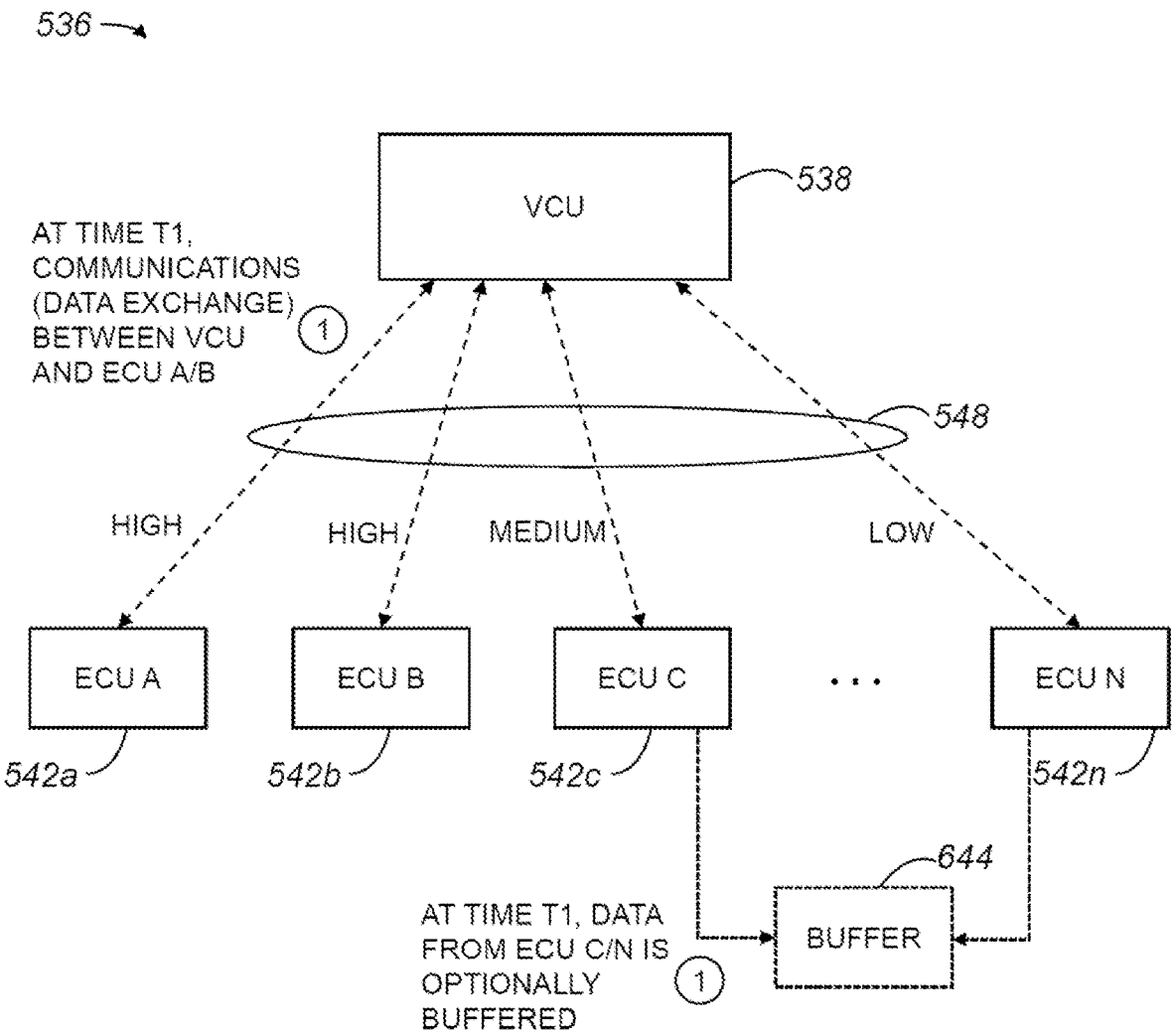
FIG. 6A is a block diagram representation of a control system, e.g., control system 536 of FIG. 3, at a time T1 at which a VCU and a plurality of ECUs with relatively high priority levels communicate in accordance with an embodiment.

When an autonomous vehicle operates as expected, e.g., when anomalous behavior is not present with respect to an autonomous vehicle, "high priority" data is generally exchanged between ECUs and a VCU included in the autonomous vehicle. FIG. 6A is a block diagram representation of a control system, e.g., control system 536 of FIG. 3, at a time T1 at which a VCU and a plurality of ECUs with relatively high priorities communicate in accordance with an embodiment. At a time T1, within control system 536, data classified as "high priority" is carried on CAN bus 548. In the embodiment as shown, data classified as "high priority" is exchanged over CAN bus 548 between ECUs 542*a*, 542*b* and VCU 538.

When control system 536 includes an optional buffer 644, at time T1, data that is not classified as "high priority" may be buffered, e.g., at least temporarily stored, in optional buffer 644 such that the data may be available at a later time if needed. As shown, at time T1, data from ECUs 542*c*, 542*n* may be stored in optional buffer 644.

Figure 6B:
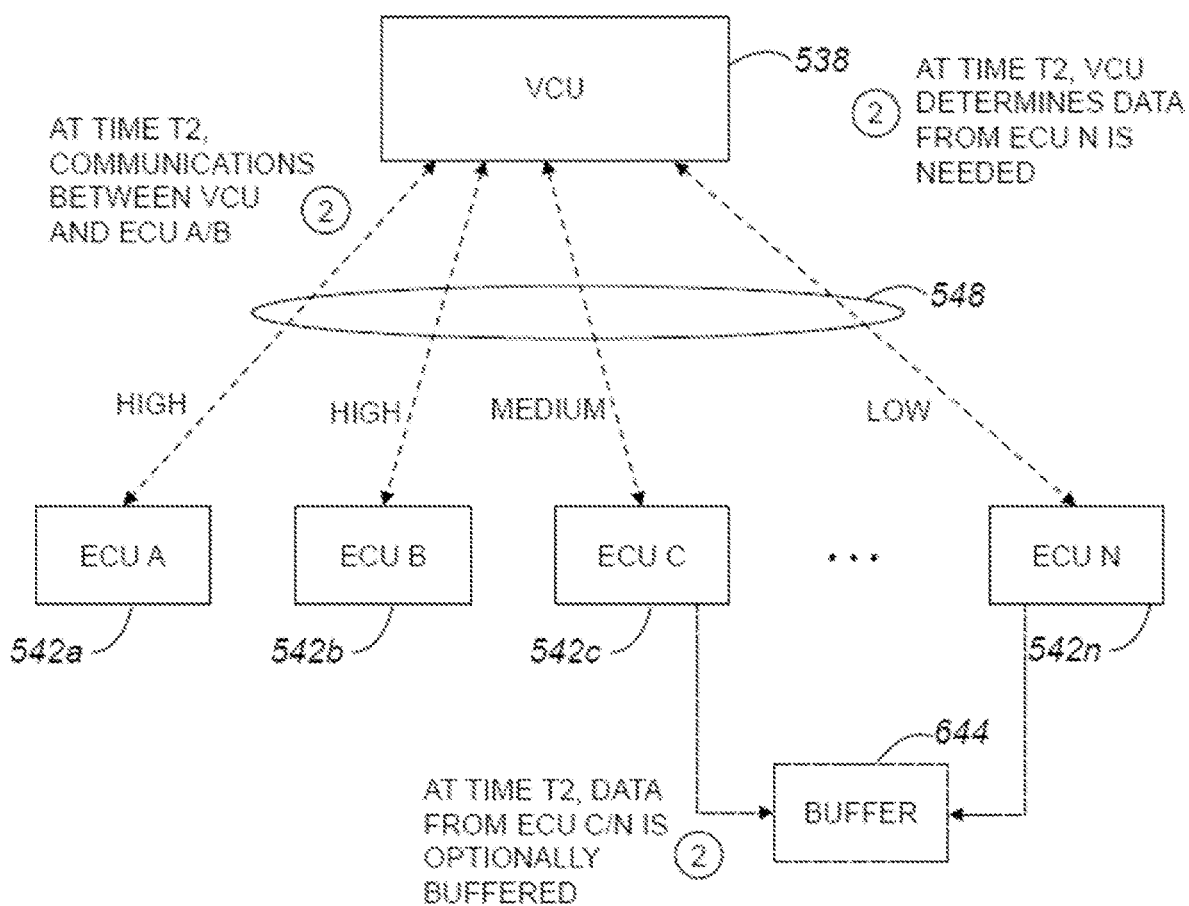
FIG. 6B is a block diagram representation of a control system, e.g., control system 536 of FIG. 3, at a time T2 at which a determination is made that a VCU needs data from an ECU with a relatively low priority level in accordance with an embodiment.

At a time T2, as shown in FIG. 6B, a determination is made that VCU 538 would benefit from obtaining relatively "low priority" data from ECU N 542*n*. Such a determination may be made by VCU 538 based upon "high priority" data exchanged on CAN bus 548. In other words, data may be provided to VCU 538 on CAN bus 548 which enables VCU 538 to determine that a particular type of data which is not currently provided on CAN bus 548 is effectively needed.

Figure 6C:
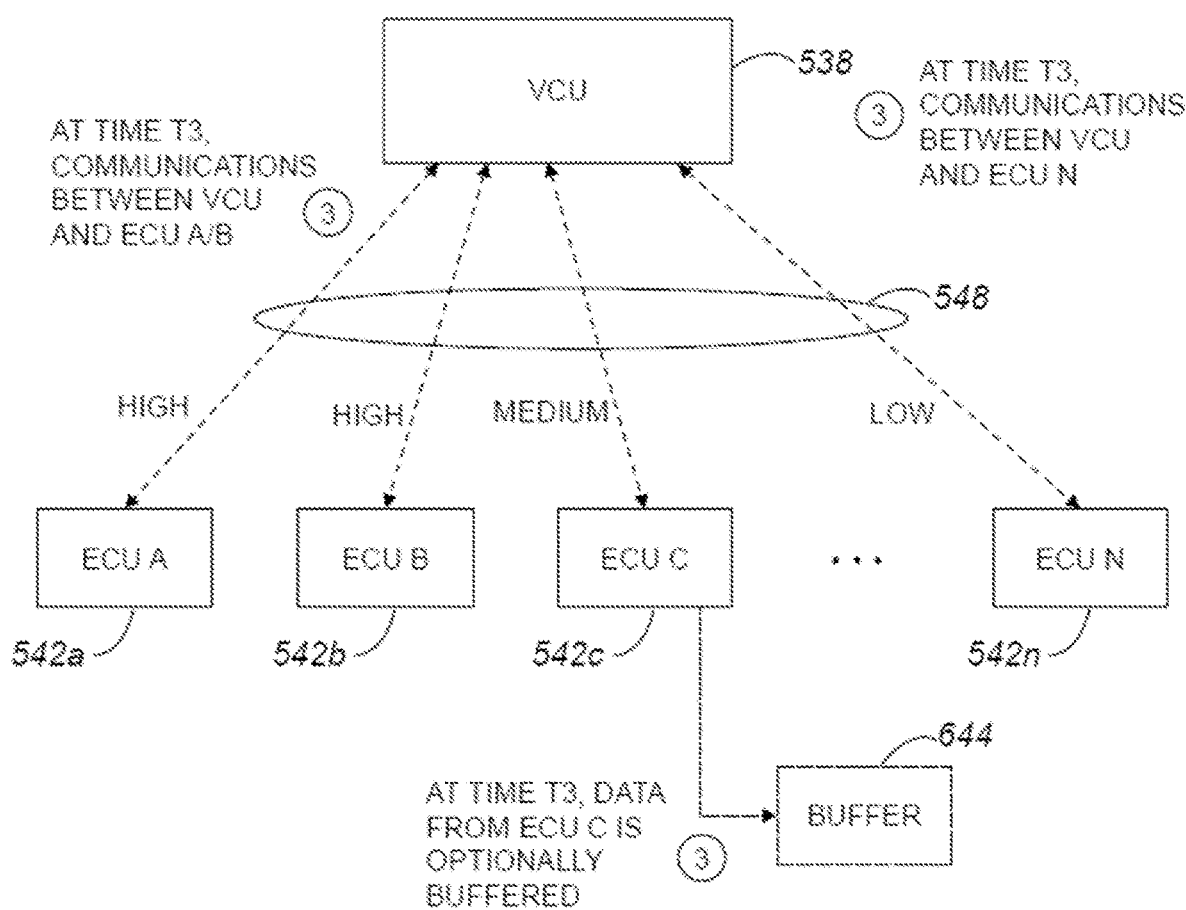
FIG. 6C is a block diagram representation of a control system, e.g., control system 536 of FIG. 3, at a time T3 at which a VCU and an ECU with a relatively low priority level communicate in accordance with an embodiment.

Upon determining at time T2 that VCU 538 would benefit from "low priority" data provided by ECU N 542*n*, VCU 538 and ECU N 542*n* exchange data through CAN bus 548 at a time T3, as shown in FIG. 6C. When ECU N 542*n* provides data to VCU 538 at time T3, ECU N 542*n* may send historical data that was previously stored in optional buffer 644, in addition to current data. Also at time T3, "high priority" data continues to be exchanged on CAN bus 548 at time T3, and data from ECU C 542*c* may continue to be stored in optional buffer 644.

Figure 7A:
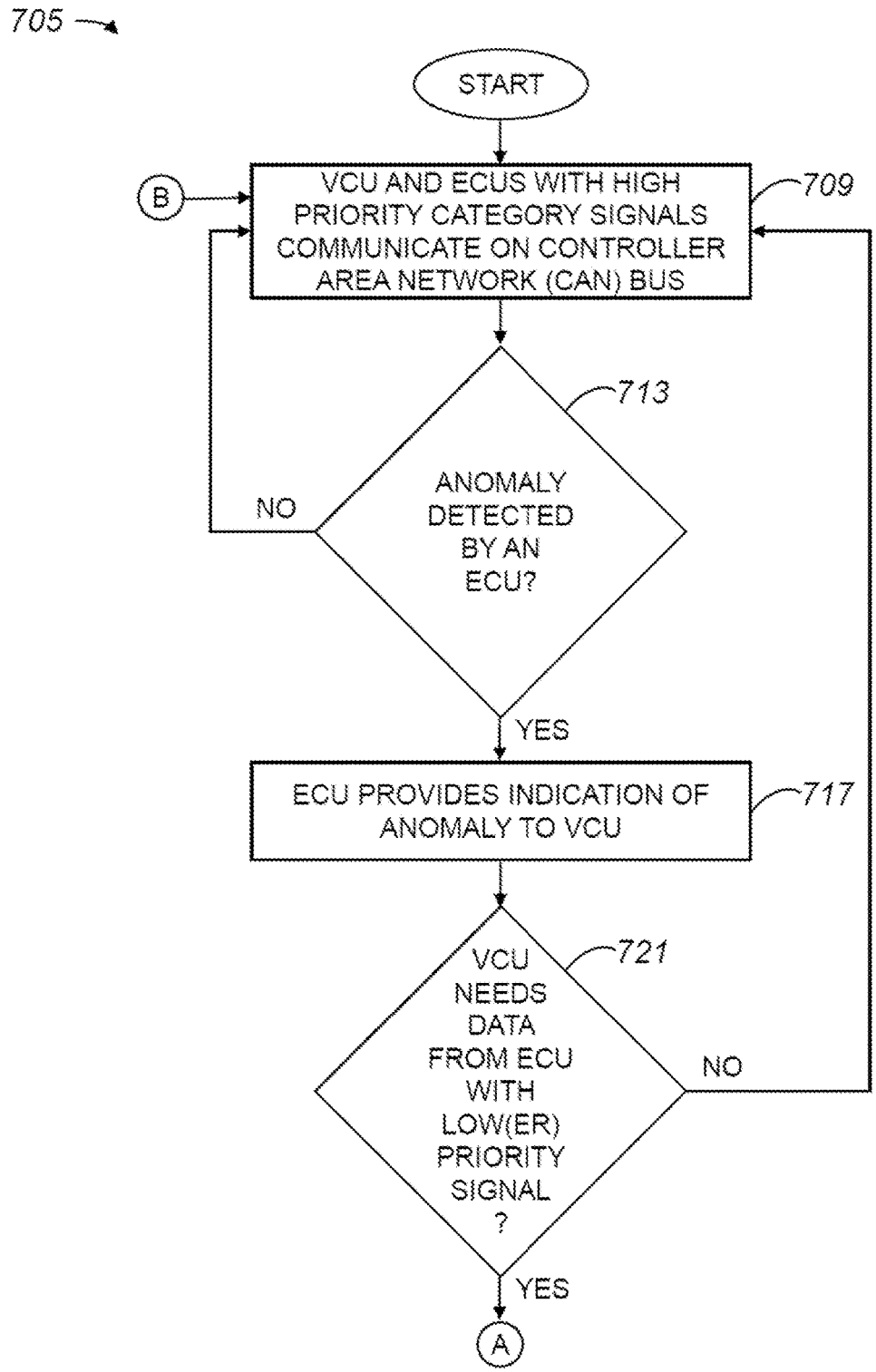
FIGS. 7A and 7B are a process flow diagram which illustrates a method of exchanging data between a VCU and one or more ECUs that efficiently utilizes bandwidth on a CAN bus in accordance with an embodiment.
Figure 7B:
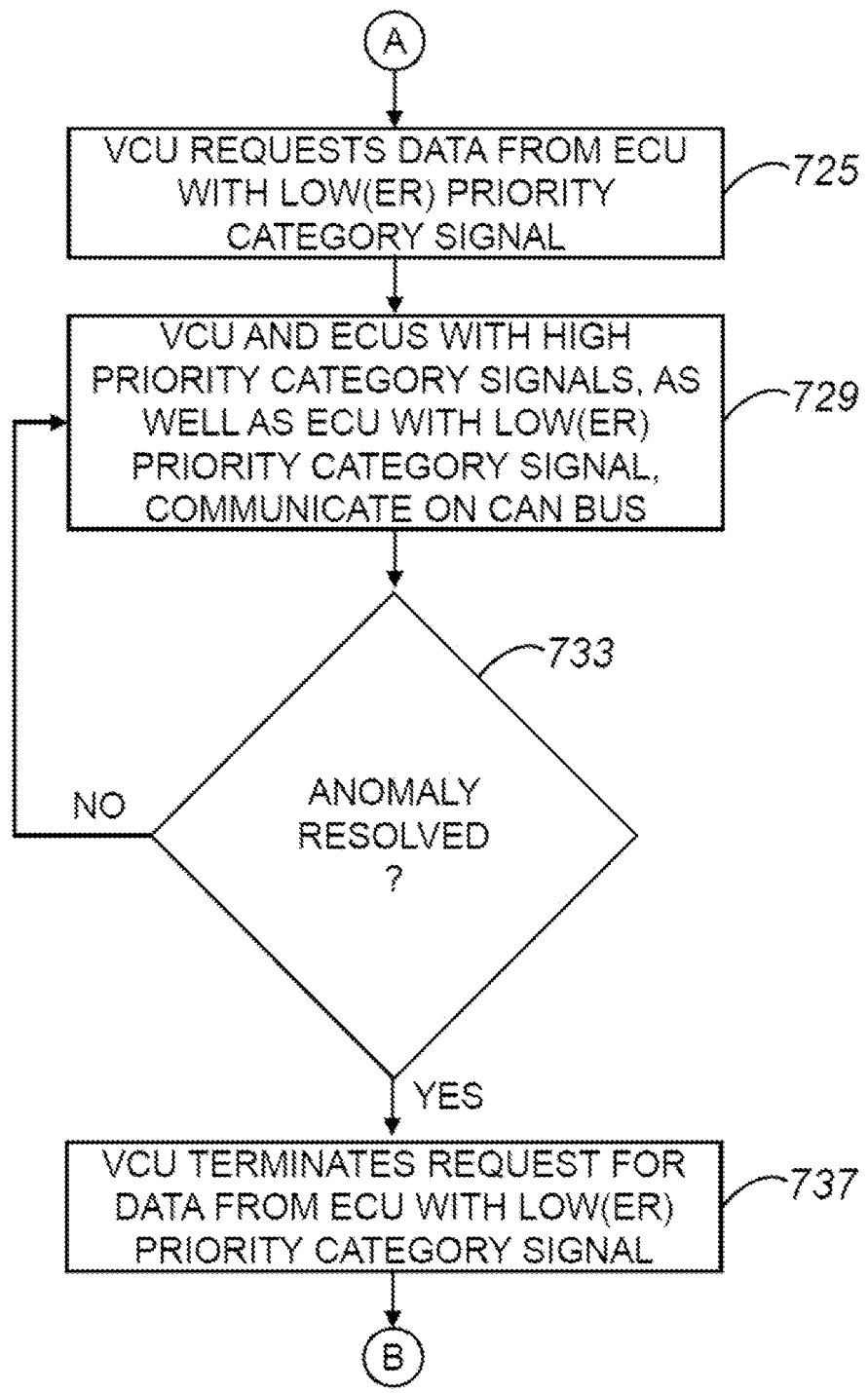

FIGS. 7A and 7B are a process flow diagram which illustrates a method of exchanging data between a VCU and one or more ECUs that efficiently utilizes bandwidth on a CAN bus in accordance with an embodiment. A method 705 of efficiently utilizing bandwidth of a CAN bus begins at a step 709 in which a VCU and ECUs with data or signals classified as having a "high priority" communicate on a CAN or a CAN bus. In other words, data or signals identified as being "high priority" are exchanged using a CAN or a CAN bus.

In a step 713, it is determined whether an ECU that is exchanging "high priority" data with the VCU has detected an anomaly or an issue. If it is determined that an anomaly has not been detected, then process flow returns to step 709 in which the VCU and ECUs with signals classified as "high priority" continue to communicate.

Alternatively, if it is determined that an anomaly has been detected by an ECU, the ECU provides an indication of the anomaly to the VCU in a step 717. In other words, an ECU, e.g., the ECU which detects or otherwise identifies an anomaly, notifies the VCU of the anomaly. Such a notification may generally involve the ECU providing an indicator to the VCU using a CAN or CAN bus.

Once the ECU notifies the VCU of the anomaly, a determination is made in a step 721 as to whether the VCU effectively needs data associated with a low, or lower, priority signal. That is, it is determined whether data that does not have a "high priority" is to be provided to the VCU. If the determination is that the VCU does not effectively need data associated with a low, or lower, priority signal, process flow returns to step 709 in which the VCU and ECUs with signals classified as "high priority" continue to communicate.

Alternatively, if the determination in step 721 is that the VCU effectively needs data associated with a low, or lower, priority signal, the VCU requests the data from the appropriate ECU in a step 725. Such a request may be made though a CAN or a CAN bus.

After the VCU requests low, or lower, priority data from the appropriate ECU, the bandwidth on a CAN or CAN bus is allocated for the signal that carries the low, or lower, priority data, and the VCU exchanges data with the appropriate ECU in a step 729. "High priority" data may continue to be exchanged between one or more ECUs and the VCU, and the requested low, or lower, priority data may also be exchanged.

A determination is made in a step 733 as to whether the anomaly is resolved. Such a determination may be based on, but is not limited to being based on, whether the VCU has mitigated the anomaly or otherwise caused the anomaly to be mitigated. If it is determined that the anomaly has not been resolved, process flow returns to step 729 in which the VCU continues to receive the low, or lower, priority data.

On the other hand, if it is determined in step 733 that the anomaly is resolved, the VCU effectively terminates the request for the low, or lower, priority data in a step 737. From step 737, process flow returns to step 709 in which the VCU and ECUs with signals classified as "high priority" continue to communicate while the low, or lower, priority data is no longer provided to the VCU.

As mentioned above, a CAN or a CAN bus may generally allocate communications bandwidth such that a significant amount of the bandwidth is allocated or earmarked for the transmission of signals containing high priority data, while a smaller amount of the bandwidth is allocated for the transmission of signals containing lower priority data, e.g., medium priority data and/or low priority data. For example, a majority of the bandwidth associated with a CAN may be allocated to exchange high priority signals, while the remaining bandwidth may be allocated to exchange low priority signals when effectively needed.

Figure 8A:
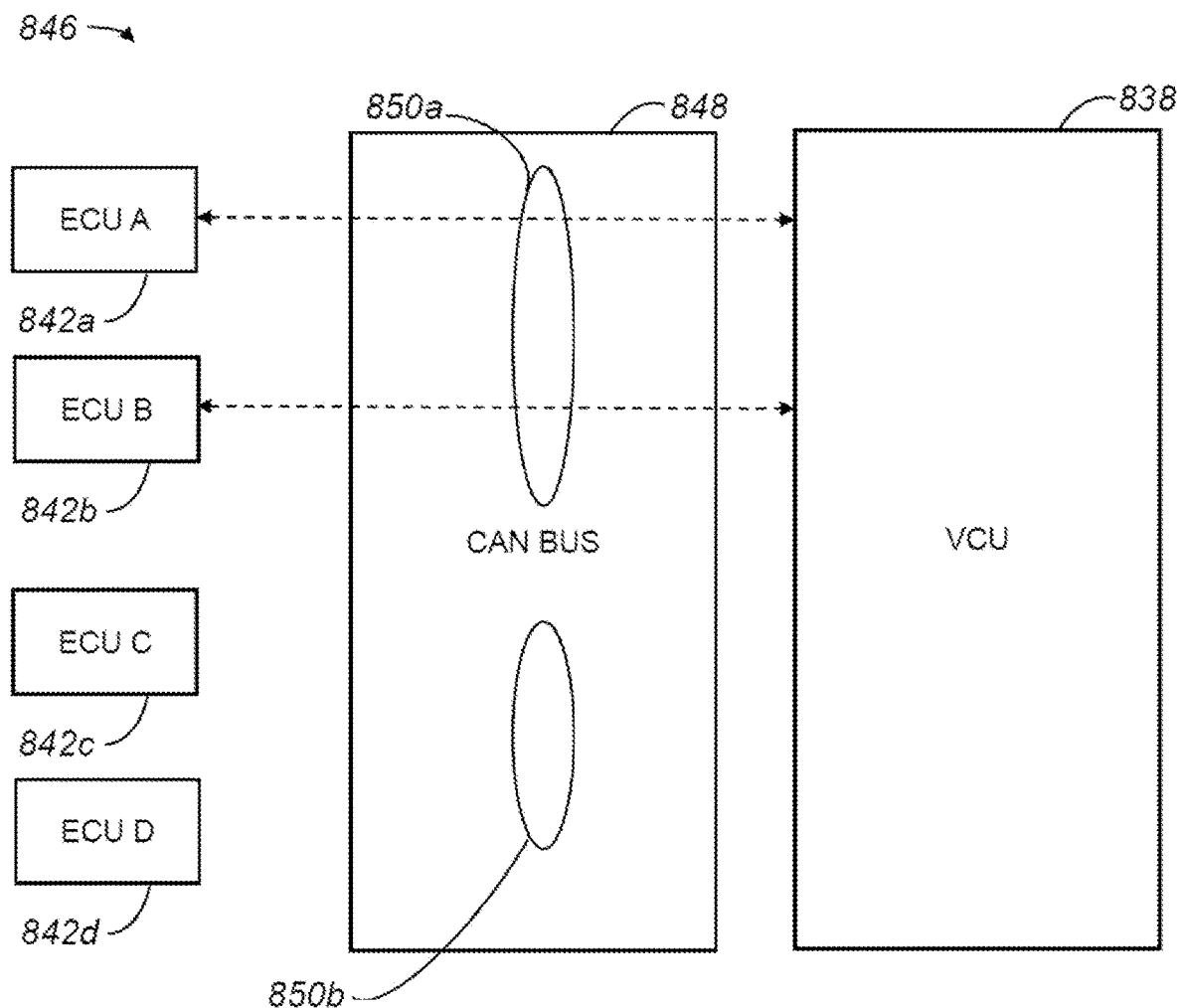
FIG. 8A is a block diagram representation of control system with a CAN bus that efficiently allocates bandwidth at a time t1 in which data with higher priority levels is provided to a VCU in accordance with an embodiment.

FIG. 8A is a block diagram representation of control system with a CAN bus that efficiently allocates bandwidth at a time t1 such that data with higher priority levels is provided to a VCU in accordance with an embodiment. At a time t1, a control system 846 is such that ECUs 842a, 842b exchange data with a VCU 838 through the use of a CAN bus 848. CAN bus 848 allocates bandwidth such that a first portion 850a is arranged to support high priority signals while a second portion 850b is arranged to support signals which are not high priority. In one embodiment, high priority signals are substantially always exchanged between ECUs 842a, 842b and VCU 838 using first portion 850a, while lower priority signals are substantially only exchanged when needed.

Figure 8B:
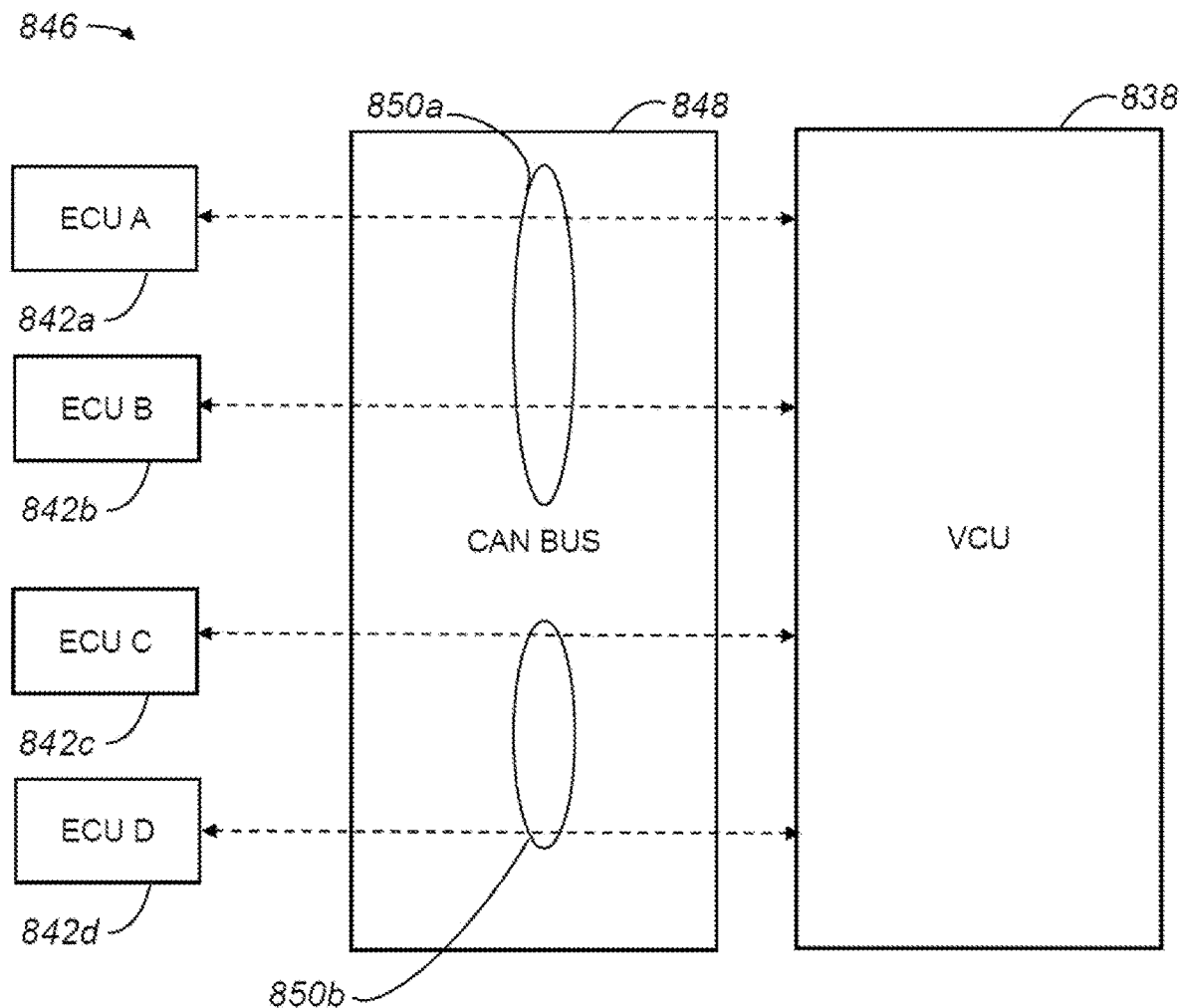
FIG. 8B is a block diagram representation of control system with a CAN bus that efficiently allocates bandwidth at a time t2 in which data with a lower priority level is provided to a VCU in accordance with an embodiment.

FIG. 8B shows control system 846 at a time t2 when a lower priority signal is provided to VCU 838 in accordance with an embodiment. When VCU 838 determines that a lower priority signal is needed, the lower priority signal may be provided to VCU 838 using second portion 850b, or bandwidth associated with CAN bus 850b that is allocated for the lower priority signal. As shown, lower priority signals associated with ECUs 842c, 842d may be exchanged with VCU 838 on portion 850b while higher priority signals associated with ECUs 842a, 842b are exchanged with VCU 838 on portion 850a.

While some ECUs may generally be associated with high priority signals and other ECUs may generally be associated with lower priority signals, it should be understood that some ECUs may be associated with both high priority signals and lower priority signals. For an ECU that is associated with signals having different priorities, the higher priority signals may substantially always be exchanged with a VCU, while the lower priority signals may be exchanged with the VCU when determined to be needed.

For example, an ECU that is a TMC may have signals that have different priority categories. "High priority" signals associated with a TMC may include, but are not limited to including, a motor direction, a degrade indicator, and/or a fault indicator. "Medium priority" signals associated with a TMC may include, but are not limited to including, an overcurrent indicator. "Low priority" signals associated with a TMC may include, but are not limited to including, phase information relating to currents, phase information relating to temperatures, and/or a motor temperature. "High priority" signals may be provided by the TMC to a VCU, while "medium priority" signals and "low priority" signals are not provided to the VCU unless determined to be needed. When the TMC detects an overcurrent, for example, the fault indicator signal may indicate an anomaly, and the overcurrent indicator may be provided to the VCU to notify the VCU that the anomaly or fault is an overcurrent. In one embodiment, upon identifying an overcurrent, the VCU may request phase information.

Figure 9:
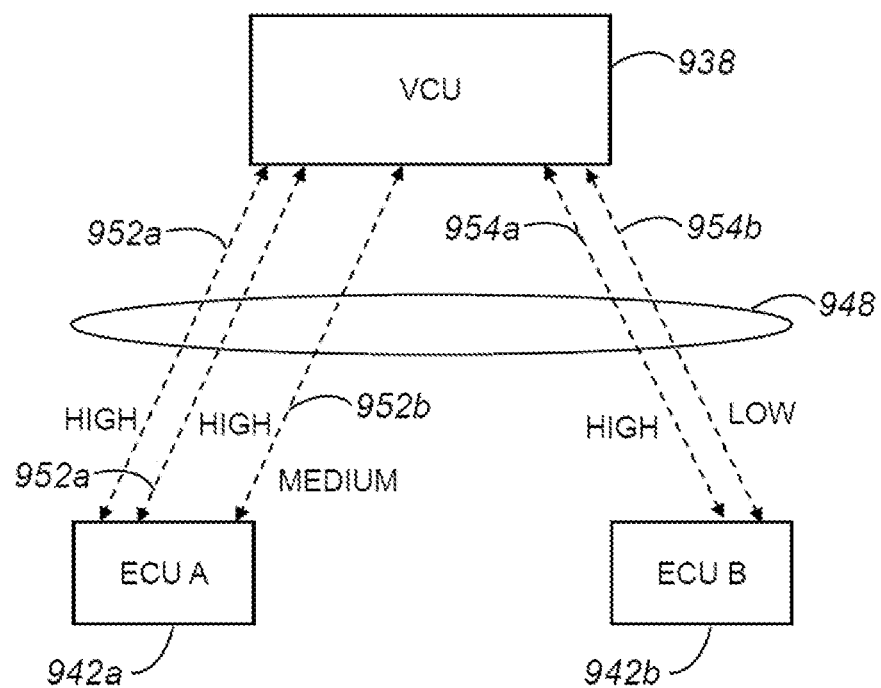
FIG. 9 is a block diagram representation of a control system which includes ECUs that are each arranged to exchange data with different priority levels or categories in accordance with an embodiment.

FIG. 9 is a block diagram representation of a control system which includes ECUs that are each associated with data or signals which have different priority levels or categories in accordance with an embodiment. A control system 936 includes a VCU 938 that communicates with ECUs 942a, 942b over a CAN or CAN bus 948.

ECU A 942a includes signals 952a which are categorized as "high priority" and a signal 942b which is categorized as "medium priority." ECU B 942b includes a signal 954a which is categorized as "high priority" and a signal 954b which is categorized as "low priority." When an autonomous vehicle that includes control system 936 is operating as expected, "high priority" signals 952a, 954a are exchanged between ECUs 942a, 942b and VCU 938. When an anomalous condition is detected, "medium priority" signal 952b and/or "low priority" signal 954b may be exchanged between ECUs 942a, 942b and VCU 938. A portion of bandwidth associated with CAN or CAN bus 948 may be allocated or reserved such that medium priority" signal 952b and/or "low priority" signal 954b are substantially only provided to CAN or CAN bus 948 when needed. In one embodiment, the majority of the bandwidth associated with CAN or CAN bus 948 may be allocated or reserved for "high priority" signals 952a, 954a.

Figure 10A:
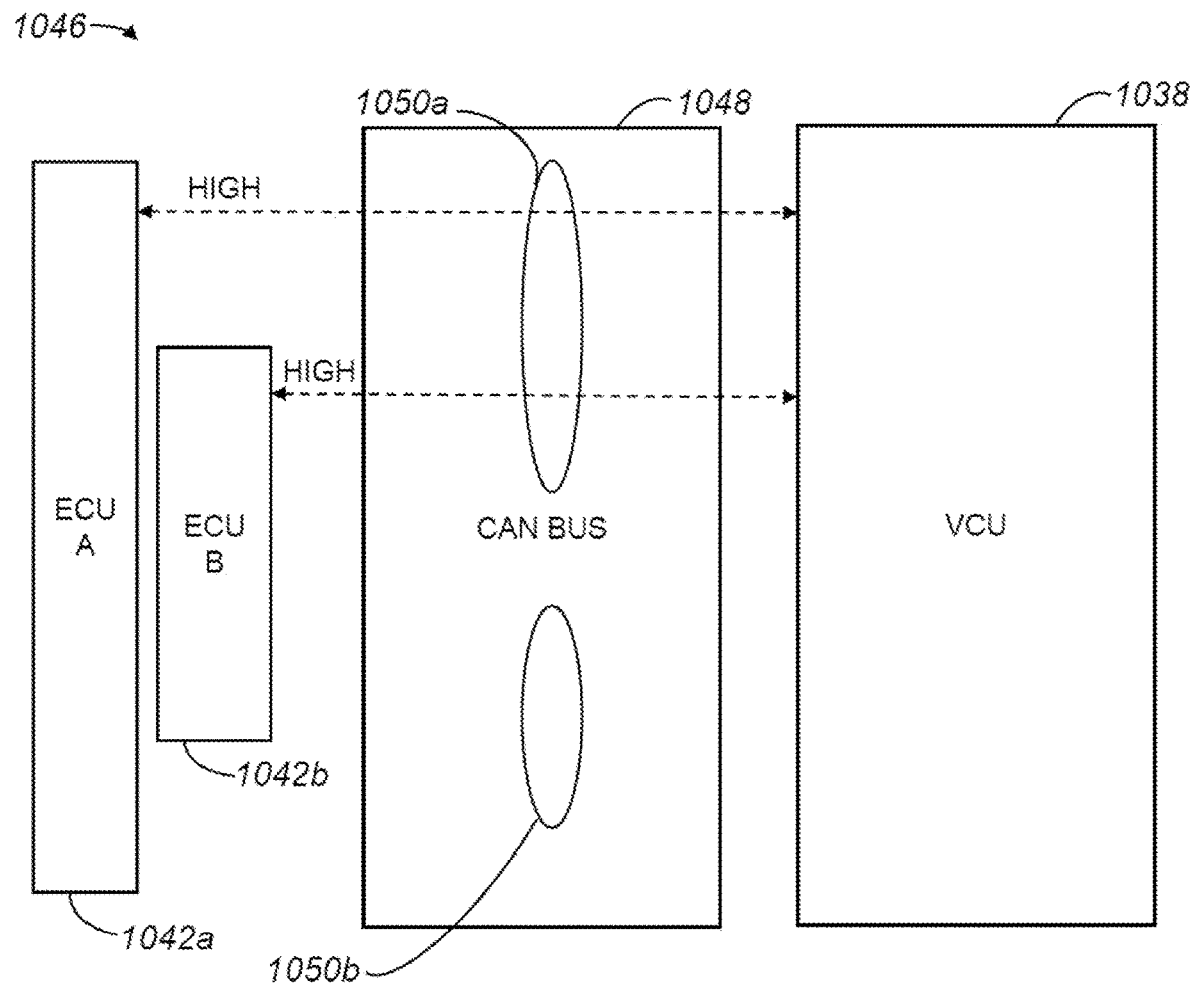
FIG. 10A is a block diagram representation of control system with a CAN bus that efficiently allocates bandwidth at a time t1 in which data with higher priority levels is provided from ECUs to a VCU in accordance with an embodiment.

FIG. 10A is a block diagram representation of control system with a CAN bus that efficiently allocates bandwidth at a time t1 in which data with higher priority levels is provided from ECUs to a VCU in accordance with an embodiment. At a time t1, a control system 1046 is such that ECUs 1042a, 1042b exchange high priority data with a VCU 1038 through the use of a CAN bus 1048. CAN bus 1048 allocates bandwidth such that a first portion 1050a is arranged to support high priority signals from both ECUs 1042a, 1042b, while a second portion 1050b is arranged to support signals which are not high priority form both ECUs 1042a, 1042b. In one embodiment, high priority signals are substantially always exchanged between ECUs 1042a, 1042b and VCU 1038 using first portion 1050a, while lower priority signals are substantially only exchanged when needed.

Figure 10B:
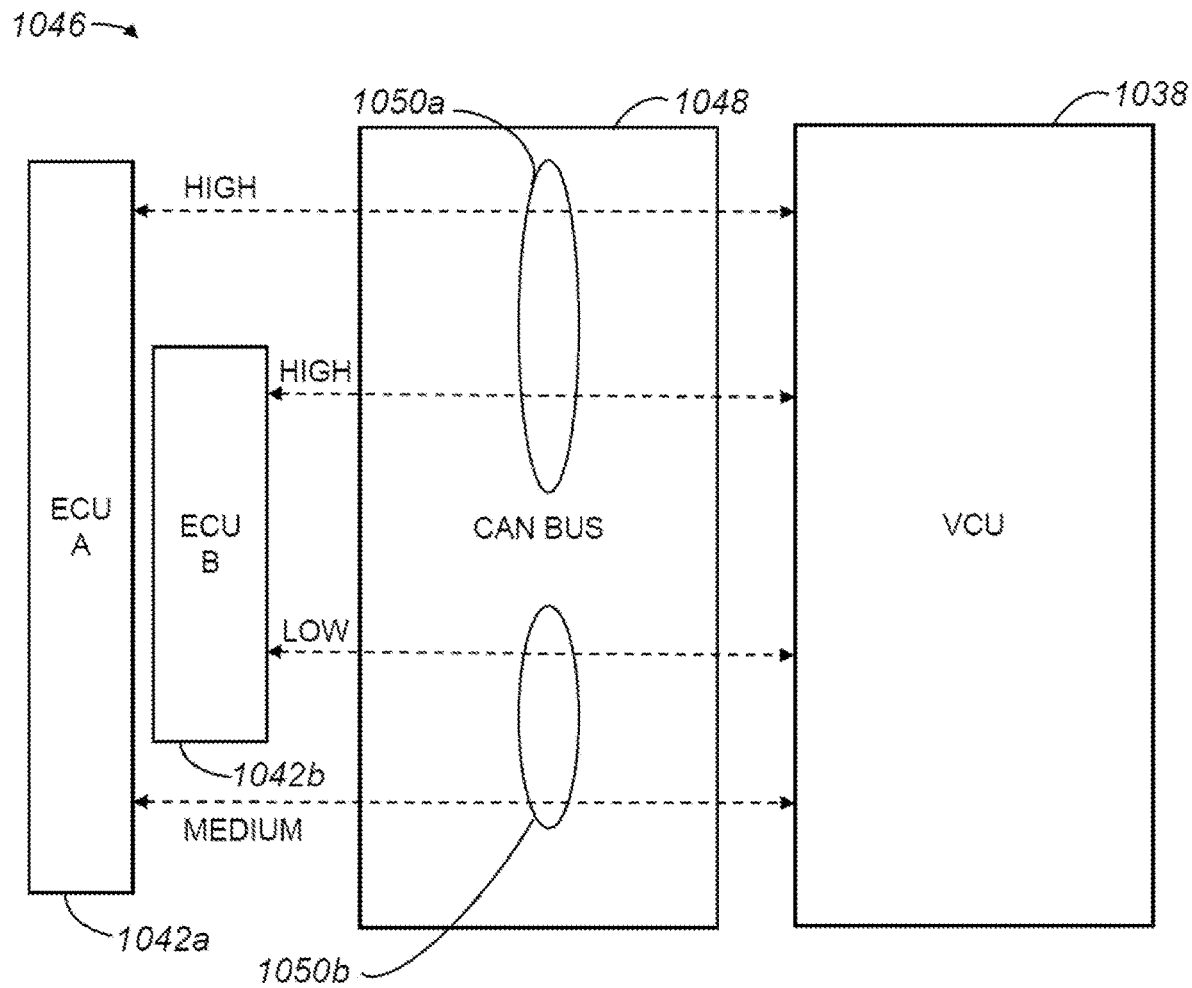
FIG. 10B is a block diagram representation of control system with a CAN bus that efficiently allocates bandwidth at a time t2 in which data with a lower priority level, e.g., a medium priority level or a low priority level, is provided from ECUs to a VCU in accordance with an embodiment.

FIG. 10B shows control system 1046 at a time t2 when a lower priority signals are provided to VCU 1038, as for example in response to a request from VCU 1038 for information associated with lower priority signals, in accordance with an embodiment. When VCU 1038 determines that lower priority signals such as medium and/or low priority signals are needed, the lower priority signals may be provided to VCU 1038 using second portion 1050*b*, or bandwidth associated with CAN bus 1050*b* that is allocated for the lower priority signals. As shown, a medium priority signal associated with ECU A 1042*a* and a low priority signal associated with ECU B 1042*b* may be exchanged with VCU 1038 on portion 1050*b* while high priority signals associated with ECUs 1042*a*, 1042*b* are exchanged with VCU 1038 on portion 1050*a*.

Figure 11A:
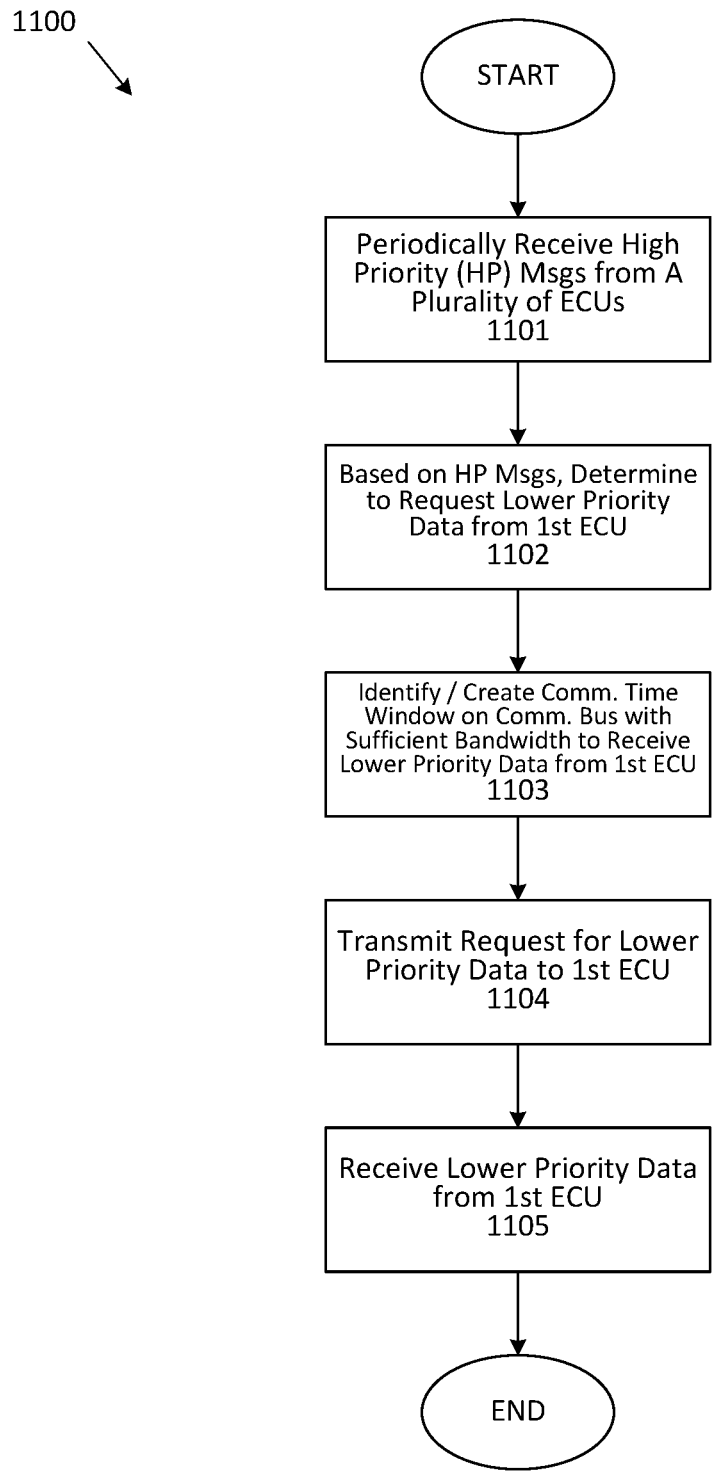
FIGS. 11A and 11B are flowchart diagrams illustrating example processes of communicating between the VCU and a plurality of ECUs to increase effective data bandwidth on the vehicle communication network between the VCU and the plurality of ECUs, in accordance with embodiments.
Figure 11B:
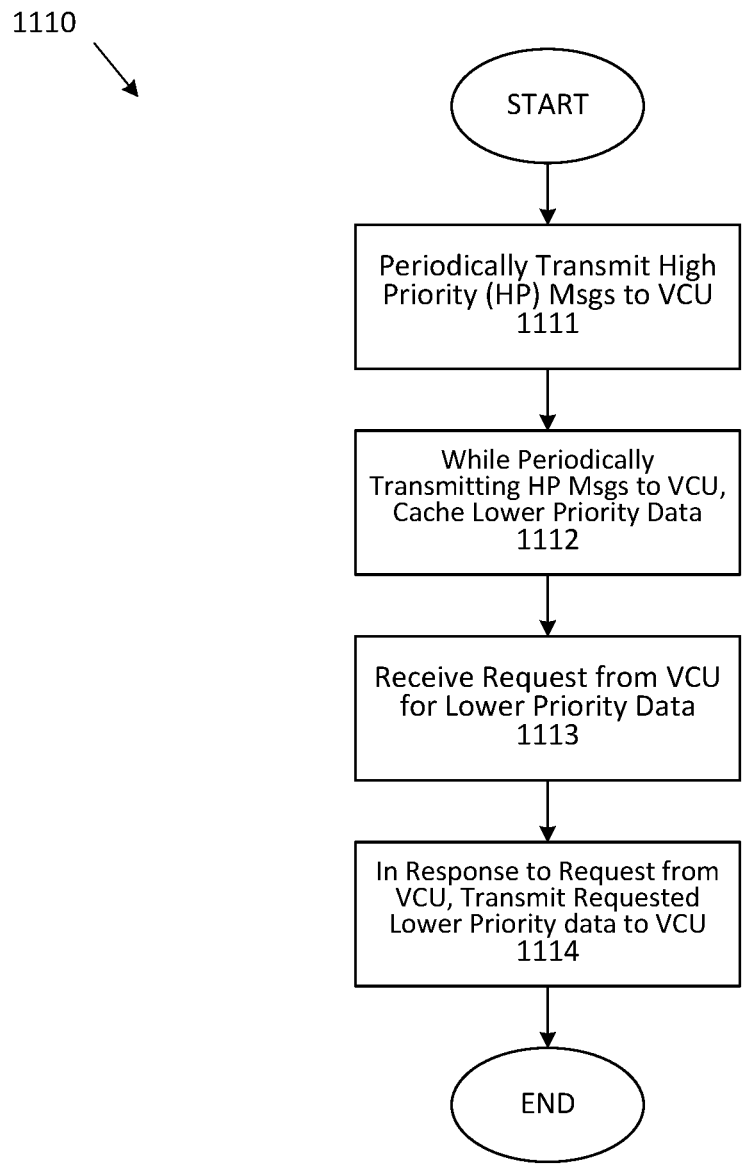

FIGS. 11A and 11B are flowchart diagrams illustrating example processes of communicating between the VCU and a plurality of ECUs to increase effective data bandwidth on the vehicle communication network between the VCU and the plurality of ECUs, in accordance with embodiments. More specifically, FIG. 11A illustrates an example process from the perspective of the VCU while FIG. 11B illustrates an example process from the perspective of an ECU in communication with the ECU.

Referring initially to FIG. 11A, process 1100 may be performed by a computing device (e.g., a VCU) in directing communications over a vehicle communication network (e.g., CAN bus, Ethernet network, etc.) between itself and a plurality of other computing devices (e.g., ECUs), in accordance with examples. At step 1101, the VCU may periodically receive high priority messages from the plurality of ECUs. As discussed herein, each ECU may be configured to control a corresponding device, sub-system, or component within the autonomous vehicle. And the high priority messages periodically received by the VCU may comprise indications of statuses of the devices, sub-systems, or components associated with the ECUs.

Figure 12:
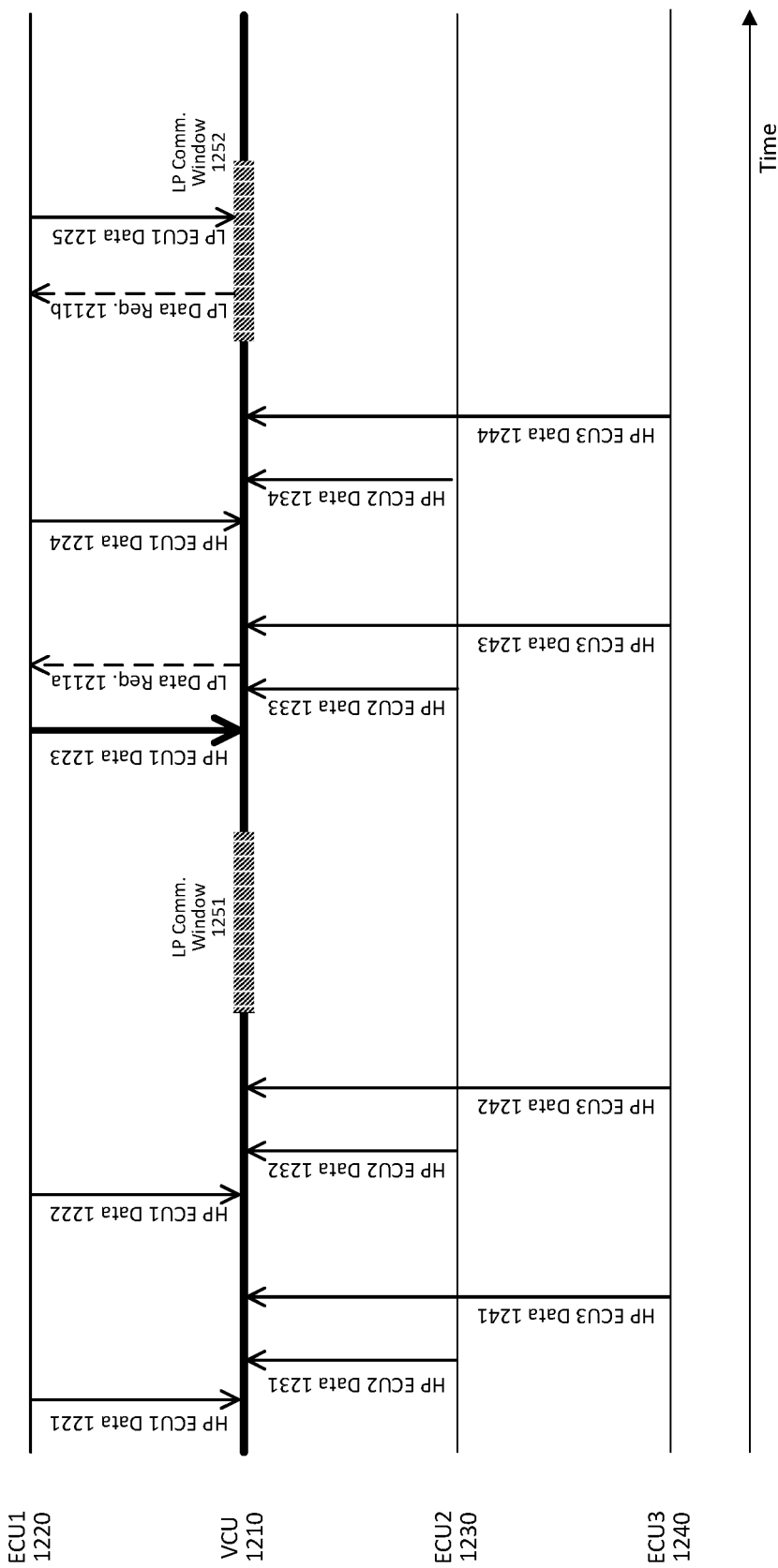
FIG. 12 is a timing diagram that illustrates an example timeline of communications between a VCU and a plurality of ECUs, in accordance with embodiments.

According to embodiments and as depicted in and discussed in further detail in FIG. 12, lower priority data or messages (e.g., medium priority data, low priority data) are not transmitted over the vehicle communication network except during times that are specifically allocated for lower priority data communications (e.g., low priority communication windows 1251 and 1252 of FIG. 12) on the vehicle communication network. Furthermore, the statuses conveyed by the high priority messages may be high level status indications of the components, devices, or sub-systems controlled by or associated with the ECUs.

According to embodiments, the VCU processes the high priority messages periodically received from each of the ECUs to determine whether to request low priority data from one or more of the ECUs. And at step 1102, the VCU may determine to request lower priority data from a first ECU based on one or more received high priority messages including, for instance, one or more high priority messages received from the first ECU. In an example, a high priority message from the first ECU may indicate a fault or error status of one or more components associated with or controlled by the first ECU. In response to receiving such a high priority message, the VCU may determine to request lower priority data from the first ECU. The lower priority data may include additional information relating to the operating conditions of the first ECU and/or the one or more components, to enable the VCU to ascertain, diagnose, and/or resolve the issue.

At step 1103, the VCU may identify or create a communication window on the vehicle communication network with sufficient data bandwidth to receive lower priority data from the first ECU. Such a communication window may be referred to as a low priority communication window (e.g., low priority communication windows 1353 and 1356 of FIG. 14). As may be appreciated, low priority communication windows may be utilized for communicating any data that is not categorized as high priority (e.g., medium priority data, low priority data, etc.). In one embodiment, low priority communication windows may be periodically allocated on the vehicle communication network such that lower priority data from one or more of the plurality of ECUs may be transmitted over the vehicle communication network (e.g., a low priority communication window every 30 seconds, a low priority communication window every minute, etc.). And the VCU may request the first ECU to transmit the lower priority data during the subsequent low priority communication window). In other embodiments, a lower priority time window may be created or specifically allocated in response to a determination by the VCU to request lower priority data. In other words, the vehicle communication network may include no low priority time windows by default and a low priority may be only allocated by the VCU in response to determining that lower priority data is required (e.g., based on a high priority message from the first ECU). In such an embodiment, the VCU may actively allocate a low priority communication window by, for example, reserving a communication time window specifically for communicating lower priority data. In some embodiments, during low priority communication windows, high priority data may still be transmitted over the vehicle communication network. Alternatively, in other embodiments, high priority data may not be transmitted during low priority communication windows.

Still further, the VCU may modify the operations of the vehicle based on a high priority message received from the plurality of ECUs to enable lower priority data to be transmitted via the vehicle communication network. In one example, the vehicle may be operating autonomously and the VCU may cause the vehicle to perform an autonomous pull-over maneuver to safely stop the vehicle based on a high priority message from the first ECU. After the autonomous pull-over maneuver is completed and the vehicle is stopped, the VCU may allocate one or more time windows on the vehicle communication network to receive lower priority data from the first ECU.

At step 1104, the VCU may transmit, to the first ECU, a request for lower priority data to cause the first ECU to transmit a set of lower priority data over the vehicle communication network during the low priority communication windows. In some implementations, the request may be transmitted outside of a low priority communication window (e.g., lower priority data request 1311*a* of FIG. 13). As an alternative, the request may be transmitted during the low priority communication window during with the lower priority data from the first ECU is to be transmitted (e.g., lower priority data request 1311*b* of FIG. 13). The request may identify which of a plurality of categories or types of available lower priority data is being requested by the VCU.

At step 1105, the VCU may receive lower priority data from the first ECU during the determined or created communication window. In response to receiving the lower priority data requested by the VCU, the VCU may diagnose any issues relating to the components or devices associated with the first ECU. For instance, the VCU may analyze the fault or issue relating to the first ECU using the set of lower priority data received from the first ECU. The VCU may be further configured to cause at least a portion of the lower priority data to be transmitted to one or more remote servers such as a logging server, to a teleoperations server, etc.

Referring now to FIG. 11B, process 1110 may be performed by an ECU in communicating with a VCU over a vehicle communication network (e.g., CAN bus, Ethernet network, etc.), in accordance with examples. At step 1111, the ECU may periodically transmit high priority messages to the VCU. As discussed with respect to FIG. 11A, the high priority messages may be transmitted during normal operations of the ECU without being requested by the VCU. In certain embodiments, the high priority messages may be transmitted at any time over the vehicle communication network. In contrast, lower priority messages or data (e.g., medium priority data, low priority data, etc.) may be transmitted only during specific times allocated on the vehicle communication network for communicating lower priority data (e.g., low priority communication windows).

Furthermore, the high priority messages may include one or more high level status indicators relating to the components or devices controlled by or associated with the ECU. At step 1112, while periodically transmitting the high priority messages to the VCU, the ECU may cache or store lower priority data relating to the operations of the components or devices controlled by or associated with the ECU. At step 1113, the ECU receives a request from the VCU for lower priority data. The request may indicate the specific data being requested to be transmitted to the VCU. At step 1114, in response to the request received from the VCU, the ECU may transmit the requested lower priority data. The ECU may retrieve the cached lower priority data to be transmitted to the VCU.

FIG. 12 is a timing diagram that illustrates an example timeline of communications between a VCU and a plurality of ECUs, in accordance with embodiments. FIG. 12 illustrates example communications between a VCU 1210, a first ECU (ECU1) 1220, a second ECU (ECU2) 1230, and a third ECU (ECU3) 1240 over a vehicle communication network. Although a VCU is illustrated in communication with three ECUs over the vehicle communication network, there should be appreciated that any number of ECUs may be implemented on a vehicle and configured to communicate with the VCU. In some embodiments, a vehicle is further not limited to a single VCU and may comprise two or more VCUs. Furthermore, it should be appreciated that the communications and data exchanges illustrated in FIG. 12 are merely examples. For instance, although not illustrated in FIG. 12, ECUs may communicate directly with one another via the vehicle communication network.

As illustrated in FIG. 12, the VCU may periodically receive high priority data or messages from each of the ECUs over the vehicle communication network. For instance, the first ECU 1220 periodically transmits high priority data, such as high priority data 1221, 1222, 1223, and 1224, to the VCU 1210 over the vehicle communication network. The second ECU 1230 periodically transmits high priority data, such as high priority data 1231, 1232, 1233, and 1234, to the VCU 120 over the vehicle communication network. And similarly, the third ECU 1240 periodically transmits high priority data, such as high priority data 1241, 1242, 1243, and 1244, to the VCU 120 over the vehicle communication network.

Furthermore, as illustrated in FIG. 12, bandwidth may be allocated on the vehicle communication network for communicating lower priority data such as medium priority data or low priority data. For example, time windows (e.g., low priority communication windows 1251 and 1252) for communicating lower priority data may be allocated on the vehicle communication network. In certain embodiments, such as the one illustrated in FIG. 12, a low priority communication window may be allocated periodically on the vehicle communication network (e.g., every 30 seconds, every minute, every two minutes, etc.). In other words, a low priority communication window, such as 1251, may be reserved on the vehicle communication network regardless of whether the VCU 1210 determines that lower priority data is to be requested and received from the ECUs. As an alternative, the lower priority time windows may be dynamically allocated based on whether the VCU 1210 determines that lower priority data is needed from any of the ECUs (e.g., based on the high priority data received from the ECUs). Thus, in such an embodiment, the low priority communication window 1251 illustrated in FIG. 12 may not be allocated since the VCU 1210 determines not to request lower priority data from any of the ECUs based on the high priority data received (e.g., high priority data 1221 and 1222 from the first ECU 1220, high priority data 1231 and 1232 from the second ECU 1230, and high priority data 1241 and 1242 from the third ECU 1240).

The ECUs may continue to periodically transmit high priority data to the VCU 1210. The first ECU 1220 may transmit high priority data 1223 and 1224 to the VCU 1210. The second ECU 1230 may transmit high priority data 1233 and 1234 to the VCU 1210. And the third ECU 1240 may transmit high priority data 1243 and 1244 to the VCU 1210. The VCU 1220 may determine, based on the high priority data 1223 received from the first ECU 1220, to request low priority data from the first ECU 1220. In response to this determination, the VCU 1210 may transmit a request to the first ECU 1220 for the low priority data. The request may be transmitted as low priority data request 1211a (e.g., during a time that is not reserved for low priority data communication) or as low priority data request 1211b (e.g., during a time window allocated for low priority data to be transmitted from the ECUs to the VCU, such as low priority data communication window 1252). In response to receiving the request 1211a or 1211b, the first ECU 1220 may transmit the requested low priority data 1225 to the VCU 1220 over the vehicle communication network.

According to embodiments, the low priority communication windows 1251 and 1252 are time windows in which low priority data may be transmitted over the vehicle communication network. In an embodiment, during times that are not allocated for low priority data transmission, medium priority and/or low priority data is not transmitted over the vehicle communication network. During these allocated times for low priority data communication, depending on the particular implementation, high priority data may still be exchanged. In certain implementations, the low priority communication windows 1251 and 1252 may be reserved only for low priority data transmissions. In other embodiments, high priority data, requests from the VCU, and/or other data, may still be transmitted during low priority communication windows.

Figure 13:
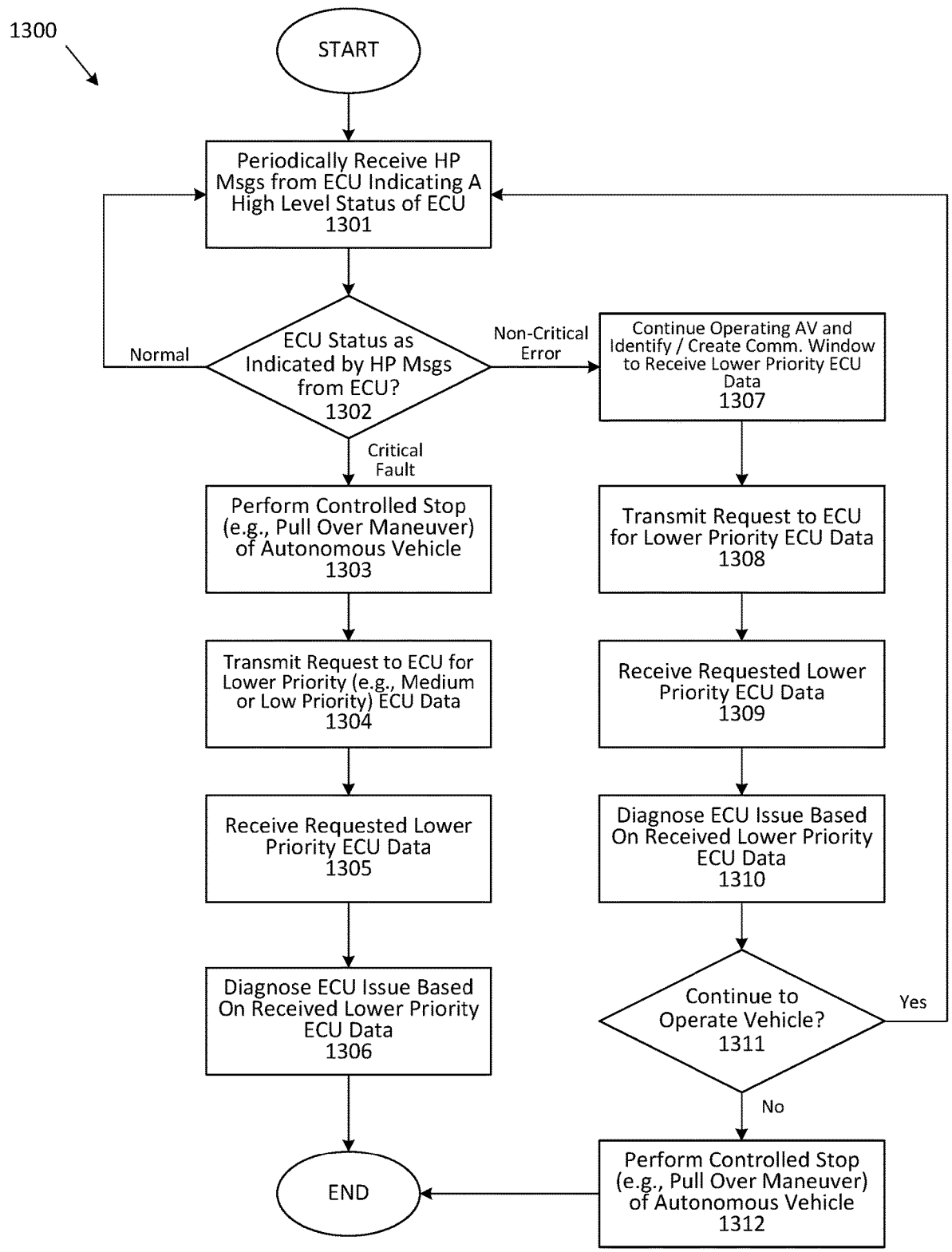
FIG. 13 is a flowchart diagram illustrating an example process of communicating between a VCU and an ECU, in accordance with embodiments.

FIG. 13 is a flowchart diagram illustrating an example process of communicating between a VCU and an ECU, in accordance with embodiments.

Process 1300 illustrated in FIG. 13 may begin at step 1301 at which the VCU periodically receives high priority messages from the ECU. According to embodiments, high priority messages periodically transmitted by the ECU may include one or more high-level status indicators relating to the ECU and/or the components, devices, or sub-systems associated with or controlled by the ECU. A high-level status indicator may indicate whether the ECU is operating normally, experiencing a critical fault (e.g., a fault that requires the vehicle to cease operating imminently) or experiencing a non-critical error. High priority messages periodically transmitted by the ECU may further include other data needed for normal operation of the vehicle. As an example, a traction motor controller (TMC) may provide, within high priority messages transmitted to the VCU, a motor direction indication for use by the autonomy system of the vehicle.

At step 1302, the VCU determines whether high-level status of the ECU as indicated by the high priority messages received from the ECU is normal, critical fault, or non-critical error. If the ECU status is normal, the VCU and ECU may continue to operate normally and return to step 1301 in which the ECU periodically transmits high priority messages to the VCU.

If a received high priority message indicates a critical fault of the ECU, the VCU may at step 1303 cause or instruct the vehicle to autonomously perform a controlled stop, such as a pull-over maneuver to stop at the side of the road. The pull-over maneuver may be performed based on current traffic conditions such that the maneuver does not pose any safety issues to the vehicle or other vehicles, pedestrians, cyclists, etc. on the road. At step 1304, the VCU may transmit, over the vehicle communication network (e.g., CAN bus) to the ECU for lower priority data from the ECU to diagnose or troubleshoot the critical fault of the ECU. The lower priority data may be data associated with medium priority or low priority. Furthermore, the request may indicate the specific data to be transmitted by the ECU to the VCU. At step 1305, the VCU receives the requested lower priority data from the ECU. At step 1306, the VCU diagnoses the ECU issue based on the lower priority data received from the ECU. As part of step 1306, the VCU may cause the received lower priority data and other data to be transmitted to one or more remote servers. The one or more remote servers may include a server configured to maintain logs for a fleet of vehicles such as vehicle 101. The one or more remote servers may also include a teleoperations server to enable a teleoperations operator to remotely monitor and/or control the vehicle. The teleoperations server may enable the teleoperations operator to view information relating to the ECU, including information indicated by the lower priority data received from the ECU.

If a received high priority message indicates a non-critical error of the ECU, at step 1307, the vehicle may continue operating and the VCU may identify or allocate bandwidth (e.g., a dedicated communication window) on the vehicle communication network for the ECU to transmit lower priority data to diagnose or troubleshoot the non-critical error. At step 1308, the VCU transmits a request for the lower priority data to the ECU. At step 1309, the VCU receives the requested lower priority data from the ECU over the vehicle communication network. At step 1310, the VCU diagnoses the non-critical error of the ECU based on the lower priority data received from the ECU at step 1309. Based on the lower priority data received from the ECU, the VCU can determine, at step 1311, whether to continue operating the vehicle or if the vehicle needs to be stopped. If the vehicle may continue operating (e.g., if the lower priority data received from the ECU does not indicate a need to stop the vehicle), the process may proceed back to step 1301. On the other hand, if the lower priority data received from the ECU indicates an issue for which the vehicle should stop operating, the VCU can cause or instruct the vehicle to autonomously perform a controlled stop at step 1312.

Figure 14:
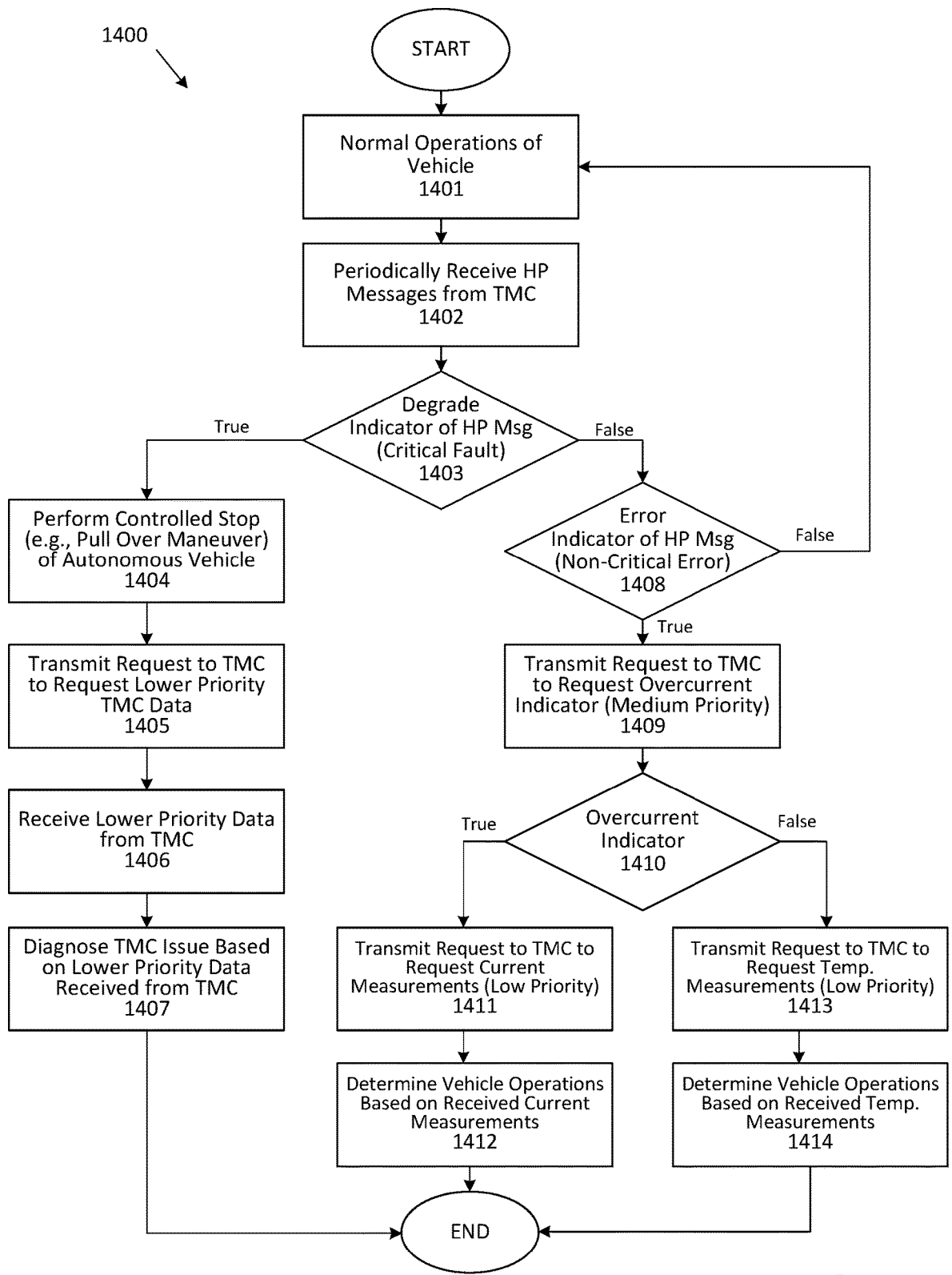
FIG. 14 is a flowchart diagram of a process of communicating between a VCU and a specific example of an ECU—a traction motor control (TMC) configured to control one or more drivetrain motors of the vehicle.

FIG. 14 is a flowchart diagram of a process of communicating between a VCU and a specific example of an ECU—a traction motor control (TMC) configured to control one or more drivetrain motors of the vehicle.

In one or more embodiments, the one or more drivetrain motors may be a three-phase AC motor having a Phase U current provided by and/or regulated by a Phase U transistor, a Phase V current provided by and/or regulated by a Phase V transistor, and a Phase W current provided by and/or regulated by a Phase W transistor. The aforementioned transistors may be implemented in any form that is suitable for providing high current and, in certain embodiments, may be insulated-gate bipolar transistors (IGBTs). The TMC may collect data pertaining to the current and/or past operating the conditions of the motor including, for example, a Phase U current measurement, a Phase U transistor temperature measurement, a Phase V current measurement, a Phase V transistor temperature measurement, a Phase W current measurement, a Phase W transistor temperature measurement, and a motor temperature measurement. The TMC may also generate a composite status such as an overcurrent status that indicates whether any overcurrent conditions have occurred, including the Phase U current, Phase V current, Phase W current, and/or a current being supplied to the TMC or elsewhere in the drivetrain motor.

In the specific context of a TMC, the high priority messages periodically transmitted from the TMC to the VCU may include a first indicator (e.g., a motor direction status) relating to the direction of the motor (e.g., forward or reverse), a second indicator (e.g., a degrade indicator) relating to whether the TMC and/or the drivetrain motor is under normal or degraded operation, and/or a third signal or status (e.g., an error indicator) relating to whether the TMC and/or the motor is experiencing an error. The motor direction status may be used by the autonomy system of the vehicle in autonomous operations and is thus communicated periodically to the VCU as part of the high priority messages transmitted to the VCU. Furthermore, the error indicator and/or the degrade indicator may provide information relating to the operating conditions of the TMC and the drivetrain motor(s) controlled by the TMC and may be periodically transmitted to the VCU as part of the high priority messages. In one embodiment, the degrade indicator may indicate a critical fault of the TMC and/or the motor(s) controlled by the TMC. And the error indicator may indicate a non-critical fault of the TMC and/or motor(s) controlled by the TMC. As an alternative, a single status signal and/or indicator may be used to indicate normal operations, a critical fault, and a non-critical error.

In response to the error indicator and/or the degrade indicator indicating that the TMC and/or the drivetrain motor(s) are experiencing errors or faults, the VCU may request the TMC to transmit lower priority data to ascertain or diagnose the errors or faults and determine a course of action. In one example, data pertaining to the Phase U current measurement, the Phase U transistor temperature measurement, the Phase V current measurement, the Phase V transistor temperature measurement, the Phase W current measurement, the Phase W transistor temperature measurement, and the motor temperature measurement may be associated with low priority in terms of communicating with the VCU. And the overcurrent condition status may be associated with medium priority in terms of communicating with the VCU. In this manner, the aforementioned detailed data relating to the operating conditions of the TMC and the motor may be transmitted over the vehicle communication network only when it is needed by the VCU (e.g., based on the high priority message indicating a fault or error).

The process 1400 illustrated in FIG. 14 may begin at step 1401 in which the vehicle, which may be an autonomous vehicle, is operating under normal operating conditions. The vehicle may be operating autonomously and controlled by an autonomy system. Under normal operating conditions, the TMC of the vehicle may periodically or continuously transmit high priority messages to the VCU of the vehicle at step 1402. As discussed previously, the high priority messages transmitted to the VCU may provide or include the motor direction status, the degrade indicator, and/or the error indicator.

At step 1403, if the degrade indicator of a received high priority message indicates that the TMC and/or motor is experiencing a critical fault, the VCU may instruct or cause the autonomy system of the vehicle to perform a controlled stop (e.g., a pull-over maneuver) at step 1404. At step 1405, the VCU may transmit a request to the TMC to request lower priority data to ascertain the cause of the critical fault and/or remedy the issue. In certain embodiments, the VCU may request that the TMC transmits the lower priority TMC data after the vehicle has completed the pull-over maneuver. In this manner, the VCU and TMC may make certain that the vehicle communication bus has sufficient bandwidth for the lower priority data, since various systems of the vehicle may enter a standby mode after the pull-over maneuver and the bandwidth requirement on the vehicle communication bus may be reduced at such time. In addition, in response to the degrade indicator indicating a critical fault, the VCU may request that the TMC transmit all available lower priority data to the VCU to enable diagnosis and/or resolution of the critical fault. For instance, previously described lower priority data such as the Phase U current measurement, the Phase U transistor temperature measurement, the Phase V current measurement, the Phase V transistor temperature measurement, the Phase W current measurement, the Phase W transistor temperature measurement, the motor temperature measurement, and the overcurrent indicator may all be requested by the VCU. At step 1406, the VCU receives the requested lower priority data from the TMC. And at step 1407, the VCU may ascertain the cause of the critical fault and diagnose the TMC issue based on the received lower priority data received from the TMC. As part of step 1407, the VCU may instruct or cause some or all of the received lower priority data to be transmitted by the vehicle to one or more remote servers such as a storage server and a teleoperations server. In this manner, the lower priority data may be obtained by the VCU and automatically transmitted to the one or more remote servers in response to the degrade indicator provided by a high priority message.

Furthermore, in response to determining that a critical fault has occurred at the TMC and/or motor, the VCU may further cause the vehicle to automatically transmit messages to one or more remote servers via a wireless data network (e.g., cellular 3G/4G/5G networks, Wi-Fi networks, etc.) to notify the one or more remote servers that the vehicle has encountered issues and so that technicians and service teams may be sent to service or retrieve the vehicle. The messages may include the precise location of the vehicle as well as information relating to the critical fault. In addition, or as an alternative, the messages to the one or more remote servers may be transmitted after the VCU diagnoses the critical fault and in response to the VCU determining that the vehicle is unable to operate.

If the degrade indicator does not indicate a critical fault in the TMC and/or the motor, the process 1400 may move to step 1408 in which the VCU determines whether the TMC and/or the motor has experienced a non-critical error based on, for example, the error indicator provided by the high priority message. If the error indicator does not indicate a non-critical error, the process may return to step 1401 in which the vehicle and the TMC continues to operate under normal operating conditions. On the other hand, if a non-critical error is indicated by the error indicator, at step 1409, the VCU may transmit a request to the TMC to request medium priority data such as the overcurrent indicator. This may be performed while the vehicle continues to operate (e.g., driving autonomously). In response to the request from the VCU, the TMC may transmit the requested medium priority data to the VCU. The VCU may allocate bandwidth on the vehicle communication network for the transmission of the requested medium priority data (e.g., a low priority communication window on the vehicle communication network). If the overcurrent indicator indicates that there is an overcurrent condition at step 1410, the VCU may, in response, at step 1411, request additional data from the TMC, such as specific low priority data that may help diagnose the overcurrent condition. For instance, the VCU may transmit a request to the TMC to request the TMC to transmit low priority data such as the Phase U current measurement, the Phase V current measurement, and the Phase W current measurement. In response to such a request, the TMC may transmit the requested low priority data to the VCU. And the VCU may, at step 1412 determine vehicle operations based on the received low priority data such as the specific current measurements. In one example, the VCU may determine to continue to operate the vehicle if the current measurements indicate that none of the current measurements exceeds a threshold level (e.g., 10% above the overcurrent threshold level). The VCU may also enter a mode of operation to continuously or periodically request low priority current measurement data such that the current measurements may be monitored more rapidly and in real-time as compared with when the vehicle and the TMC is operating under normal operations. In another example, the VCU may determine, based on the specific current measurements, that the power output by the motor needs to be reduced (e.g., to prevent damage to the components such as the IGBTs of the motor). In response, the VCU may instruct the autonomy system and/or the path planner of the vehicle to reduce the maximum allowed acceleration to protect the TMC and/or the motor. In yet another example, the VCU may, in response to the received low priority current measurements, to determine to instruct or cause the vehicle to perform a controlled stop (e.g., to perform an autonomous pull-over maneuver).

At step 1413, if the overcurrent indicator (which is associated with medium priority) received from the TMC does not indicate an overcurrent condition, the VCU may instead request certain low priority data from the TMC (e.g., the low priority data maintained by the TMC excluding the current measurements). As an example, in response to the received overcurrent indicator not indicating an overcurrent condition at the TMC and/or the motor, the VCU may transmit a request to the TMC for the Phase U transistor temperature measurement, the Phase V transistor temperature measurement, the Phase W transistor temperature measurement, and the motor temperature measurement. At step 1414, the VCU may determine vehicle operations based on the received low priority data, such as the temperature measurement data, received from the TMC. For instance, the VCU may determine to instruct or cause the vehicle to autonomously perform a pull-over maneuver in the event that one or more of the temperature measurements exceeds a certain threshold.

Figure 15:
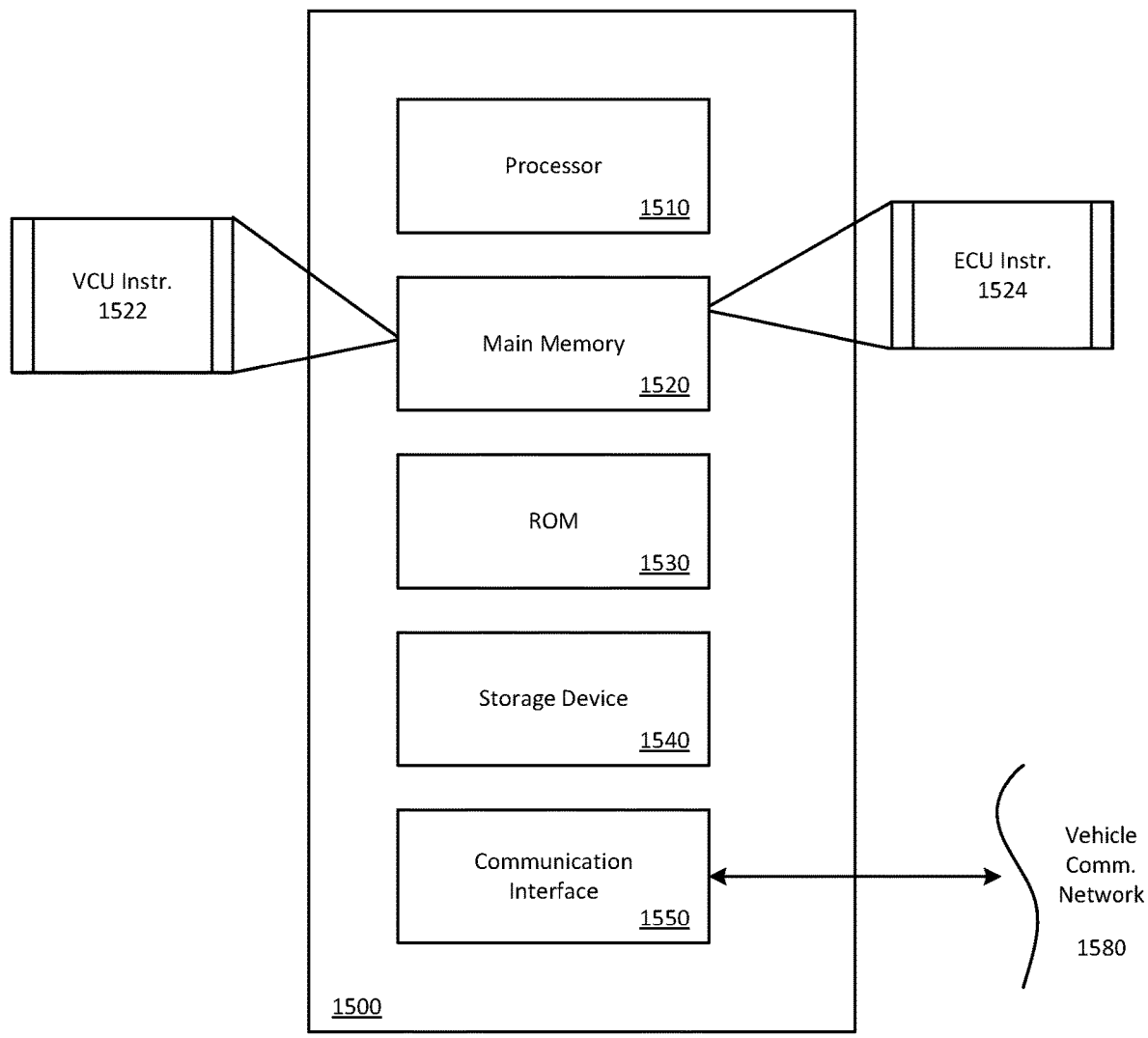
FIG. 15 is a block diagram of an example computing device upon which examples described herein may be implemented, in accordance with embodiments.

FIG. 15 is a block diagram of an example computing device upon which examples described herein may be implemented, in accordance with embodiments. For example, the computing device 1500 may be implemented as a VCU or, alternatively, as an ECU, such as described in FIGS. 1 through 14.

According to embodiments, the computing device 1500 may include processing resources 1510, a main memory 1520, and a communication interface 1550. The computing device 1500 includes at least one processor 1510 for processing information stored in the main memory 1520, such as provided by a random-access memory (RAM) or other dynamic storage device, for storing information and instructions which are executable by the processor 1510. The main memory 1520 also may be used for storing temporary variables or other intermediate information during execution of instructions to be executed by the processor 1510. The computing device 1500 may also include the ROM 1530 or other static storage device for storing static information and instructions for the processor 1510. A storage device 1540, such as a magnetic disk or flash memory, is provided for storing information and instructions. The communication interface 1550 enables the computing device 1500 to communicate with vehicle communication network 1580 (e.g., CAN bus, Ethernet network). Via the vehicle communication network 1580, the computing device 1500 can communicate with one or more other components of the vehicle.

According to embodiments, the main memory 1520 may store instructions such as VCU instructions 1522 which enable the computing device 1500 to operate as a VCU of the vehicle. In operating as a VCU, the computing device 1500 may communicate with a plurality of ECUs of the vehicle may determine, command, or control vehicle operations. In executing the VCU instructions 1522, the computing device 1500 may perform the functions and steps herein, including process 1100 illustrated in FIG. 11A, process 1300 illustrated in FIG. 13, and process 1400 illustrated in FIG. 14. Alternatively, the main memory 1520 may store instructions such as ECU instructions 1524 which enable the computing device 1500 to operate as an ECU of the vehicle. An ECU may be, but is not limited to being, a TMC. In executing the VCU instructions 1522, the computing device 1500 may perform the functions and steps herein, including process 1110 illustrated in FIG. 11B, process 1300 illustrated in FIG. 13, and process 1400 illustrated in FIG. 14.

Although only a few embodiments have been described in this disclosure, it should be understood that the disclosure may be embodied in many other specific forms without departing from the spirit or the scope of the present disclosure. By way of example, while ECUs have been described as including TMCs, ECUs are not limited to being TMCs.

The assignment of priority levels to data or data signals, or the categorization of data or data signals, may be performed by any suitable party. For example, priority levels may be assigned by a manufacturer of an autonomous vehicle or by a user of an autonomous vehicle. In addition, the number of assigned priority levels may vary widely. That is, priority levels are not limited to including a "high" priority level, a "medium" priority level, and/or a "low" priority level.

The systems described above are not limited to being implemented or otherwise used with respect to vehicles such as autonomous vehicles. For example, the efficient allocation of bandwidth is not limited to being applied to a CAN or a CAN bus. In general, the efficient allocation of bandwidth as described above may be applied to any suitable communication network. In addition to a CAN, other suitable communication networks may include, but are not limited to including, an Ethernet network.

While the efficient allocation of bandwidth may be used to support the operation of an autonomous vehicle, it should be understood that the efficient allocation of bandwidth as discussed above may be applied to systems other than autonomous vehicles. For instance, the systems and methods described above may be applied to any suitable autonomous transportation system or autonomy-based product or system without departing from the spirit or the scope of the disclosure.

An autonomous vehicle has generally been described as a land vehicle, or a vehicle that is arranged to be propelled or conveyed on land. It should be appreciated that in some embodiments, an autonomous vehicle may be configured for water travel, hover travel, and or/air travel without departing from the spirit or the scope of the present disclosure. In general, an autonomous vehicle may be any suitable transport apparatus that may operate in an unmanned, driverless, self-driving, self-directed, and/or computer-controlled manner.

The embodiments may be implemented as hardware, firmware, and/or software logic embodied in a tangible, i.e., non-transitory, medium that, when executed, is operable to perform the various methods and processes described above. That is, the logic may be embodied as physical arrangements, modules, or components. For example, the systems of an autonomous vehicle, as described above with respect to FIG. 3, may include hardware, firmware, and/or software embodied on a tangible medium. A tangible medium may be substantially any computer-readable medium that is capable of storing logic or computer program code which may be executed, e.g., by a processor or an overall computing system, to perform methods and functions associated with the embodiments. Such computer-readable mediums may include, but are not limited to including, physical storage and/or memory devices. Executable logic may include, but is not limited to including, code devices, computer program code, and/or executable computer commands or instructions.

It should be appreciated that a computer-readable medium, or a machine-readable medium, may include transitory embodiments and/or non-transitory embodiments, e.g., signals or signals embodied in carrier waves. That is, a computer-readable medium may be associated with non-transitory tangible media and transitory propagating signals.

The steps associated with the methods of the present disclosure may vary widely. Steps may be added, removed, altered, combined, and reordered without departing from the spirit of the scope of the present disclosure. Therefore, the present examples are to be considered as illustrative and not restrictive, and the examples are not to be limited to the details given herein, but may be modified within the scope of the appended claims.

What is claimed is:

1. A vehicle control unit for a vehicle, the vehicle control unit comprising:
   one or more processors;
   one or more communication interfaces for communicating over a vehicle communication network; and
   one or more memory resources storing instructions that, when executed by the one or more processors of the vehicle control unit, cause the vehicle control unit to:
   periodically obtain high priority messages over the vehicle communication network from a plurality of electronic control units;
   determine, based on a first high priority message received from a first electronic control unit of the plurality of vehicle control units, to request a set of lower priority data from the first electronic control unit;
   transmit, over the vehicle communication network to the first electronic control unit, a request to cause the first electronic control unit to transmit the set of lower priority data to the vehicle control when it is determined to request the set of lower priority data from the first electronic control unit; and obtain the set of lower priority data over the vehicle communication network from the first electronic control unit while periodically obtaining the high priority messages over the vehicle communication network.

2. The vehicle control unit of claim 1, wherein the set of lower priority data is transmitted by the first electronic control unit over the vehicle communication network during a first low priority communication window; and wherein the high priority messages are associated with a high priority and the set of lower priority data is associated with a medium priority or a low priority.

3. The vehicle control unit of claim 2, wherein the executed instructions further cause the vehicle control unit to allocate the first low priority communication window in response to determining to request the set of lower priority data from the first electronic control unit.

4. The vehicle control unit of claim 2, wherein the first low priority communication window is one of a plurality of low priority communication windows that are periodically allocated for transmitting data associated with the medium priority or the low priority.

5. The vehicle control unit of claim 2, wherein data associated with the medium priority or the low priority is transmitted over the vehicle communication network during times specifically allocated for transmitting data associated with the medium priority or the low priority.

6. The vehicle control unit of claim 1, wherein the first high priority message obtained from the first electronic control unit includes a first status indication relating to one or more components of the vehicle controlled by the first electronic control unit; and wherein the set of lower priority data requested by the vehicle control unit and obtained from the first electronic control unit includes additional information relating to the one or more components of the vehicle controlled by the first electronic control unit.

7. The vehicle control unit of claim 6, wherein the first status indication of the first high priority message indicates a fault associated with the first electronic control unit or the one or more components; and wherein the executed instructions further cause the vehicle control unit to analyze the fault based on the set of lower priority data received from the first electronic control unit.

8. The vehicle control unit of claim 6, wherein the first electronic control unit is a traction motor controller and the one or more components includes a motor; and wherein the additional information includes one or more of: (i) an overcurrent indicator, (ii) current measurement data, or (iii) temperature measurement data.

9. The vehicle control unit of claim 1, wherein the executed instructions further cause the vehicle control unit to cause at least a portion of the set of lower priority data received from the first electronic control unit to be transmitted to a remote server, the vehicle control unit being a domain controller for the vehicle, the first electronic control unit being arranged to control at least one electrical component of the vehicle.

10. A method of communication between electrical components of a vehicle, the method comprising:

periodically transmitting, by each of a plurality of electronic control units over a communication network to a vehicle control unit, high priority messages, wherein each of the electronic control units controls a corresponding set of one or more electrical components within the vehicle;

determining, using the vehicle control unit, whether to request lower priority data from a first electronic control unit of the plurality of electronic control units based on a first high priority message received from the first electronic control unit;

in response to determining to request the lower priority data from the first electronic control unit, transmitting a request for lower priority data, to the first electronic control unit over the communication network; and in response to obtaining the request for the lower priority data on the first electronic control unit, transmitting a first set of lower priority data to the vehicle control unit over the communication network while periodically transmitting the higher priority messages.

11. The method of claim 10, wherein the set of lower priority data is transmitted by the first electronic control unit over the vehicle communication network during a first low priority communication window; and wherein the high priority messages are associated with a high priority and the set of lower priority data is associated with a medium priority or a low priority.

12. The method of claim 11, further comprising allocating, by the vehicle control unit, the first low priority communication window in response to determining to request lower priority data from the first electronic control unit.

13. The method of claim 11, wherein the first low priority communication window is one of a plurality of low priority communication windows that are periodically allocated for transmitting data associated with the medium priority or the low priority.

14. The method of claim 11, wherein data associated with the medium priority or the low priority is transmitted over the vehicle communication network during times specifically allocated for transmitting data associated with the medium priority or the low priority.

15. The method of claim 10, wherein the first high priority message received from the first electronic control unit includes a first status indication relating to one or more components of the vehicle controlled by the first electronic control unit; and wherein the set of lower priority data requested by the vehicle control unit and obtained from the first electronic control unit includes additional information relating to the one or more electrical components of the vehicle controlled by the first electronic control unit.

16. The method of claim 15, wherein the first status indication of the first high priority message indicates a fault associated with the first electronic control unit or the one or more electrical components.

17. The method of claim 16, further comprising:

analyzing the fault based on the set of lower priority data received from the first electronic control unit;

determining whether the fault affects operation of the vehicle; and performing a controlled stop of the vehicle when it is determined that the fault affects the operation of the vehicle.

18. The vehicle of claim 17, wherein the vehicle control unit is further configured to cause the vehicle to perform an autonomous pull-over maneuver based on the first high priority message received from the first electronic control unit.

19. The method of claim 10, further comprising transmitting at least a portion of the set of lower priority data received from the first electronic control unit to a remote server.

20. A vehicle capable of operating autonomously or semi-autonomously, the vehicle comprising:
  a plurality of electronic control units including a first electronic control unit configured to control a first set of one or more electrical components of the vehicle; and
  a vehicle control unit configured to:
    communicate with each of the plurality of electronic control units over a vehicle communication network of the vehicle, including periodically receiving a plurality of high priority messages from the first electronic control unit;
    determine, based on one or more of the high priority messages received from the first electronic control unit, to request a set of lower priority data from the first electronic control unit;
    transmit, over the vehicle communication network to the first electronic control unit, a request to cause the first electronic control unit to transmit the set of lower priority data to the vehicle control unit over the vehicle communication network;
    obtain the set of lower priority data from the first electronic control unit while periodically receiving the plurality of high priority messages from the first electronic control unit;
    diagnose an issue with the first electronic control unit based on the set of lower priority data;
    determine, based on the issue, whether to continue to operate the vehicle; and
    cause the vehicle to continue to operate when it is determined to continue to operate the vehicle.

* * * * *